United States Patent
Gliniecki et al.

[19]

[11] Patent Number: 5,881,535
[45] Date of Patent: Mar. 16, 1999

[54] APPARATUS AND METHOD FOR FILLING AND SEALING INTRAVENOUS SOLUTION BAGS

[75] Inventors: Robert L. Gliniecki, Spring Grove; John Kivlehan, Green Oak, both of Ill.

[73] Assignee: Baxter International, Inc., Deerfield, Ill.

[21] Appl. No.: 874,994

[22] Filed: Jun. 13, 1997

Related U.S. Application Data

[63] Continuation-in-part of Ser. No. 595,996, Apr. 9, 1996, abandoned.

[51] Int. Cl.$^6$ .............................. B65B 55/04; B65B 3/00
[52] U.S. Cl. .............................. 53/410; 53/426; 53/461; 53/133.2; 53/167; 53/284.7; 53/253; 53/DIG. 2
[58] Field of Search ............................ 53/410, 425, 468, 53/471, 133.2, 284.7, DIG. 2, 253, 167, 426, 469

[56] References Cited

U.S. PATENT DOCUMENTS

| | | |
|---|---|---|
| 2,949,712 | 3/1960 | Bieberdorf et al. . |
| 3,035,886 | 5/1962 | Hickey . |
| 3,269,079 | 8/1966 | Schmied . |
| 3,376,687 | 4/1968 | Gewecke . |
| 3,403,064 | 9/1968 | Bellamy . |
| 3,466,841 | 9/1969 | Rausing . |
| 3,486,295 | 12/1969 | Raufing et al. . |
| 3,491,503 | 1/1970 | Ashton et al. . |
| 3,514,919 | 6/1970 | Ashton et al. . |
| 3,531,908 | 10/1970 | Rausing et al. . |
| 3,538,669 | 11/1970 | Broman et al. . |
| 3,920,504 | 11/1975 | Sihoh et al. ............................ 156/580 |
| 3,939,033 | 2/1976 | Grgach et al. ........................... 156/515 |
| 4,045,939 | 9/1977 | Baurnstingl ............................. 53/22 A |
| 4,145,236 | 3/1979 | Neumayer et al. ................... 53/DIG. 2 |
| 4,295,563 | 10/1981 | Becker et al. .......................... 206/205 |
| 4,313,778 | 2/1982 | Mims .................................... 156/358 |
| 4,350,649 | 9/1982 | Summo .................................. 264/23 |
| 4,411,720 | 10/1983 | Sager ..................................... 156/69 |
| 4,417,607 | 11/1983 | Scholle et al. ............................. 141/1 |
| 4,452,030 | 6/1984 | Inada ........................................ 53/426 |
| 4,466,553 | 8/1984 | Zenger .................................... 220/461 |
| 4,494,363 | 1/1985 | Rica et al. ................................ 53/426 |
| 4,530,202 | 7/1985 | Powell et al. ........................... 53/426 |
| 4,580,393 | 4/1986 | Furukawa .............................. 53/253 X |
| 4,587,793 | 5/1986 | Brennan et al. ......................... 53/425 |
| 4,730,435 | 3/1988 | Riddle et al. ............................ 53/167 |
| 4,769,095 | 9/1988 | Sager ....................................... 156/69 |
| 4,790,841 | 12/1988 | Lundh et al. ........................... 604/406 |
| 4,872,553 | 10/1989 | Suzuki et al. ......................... 206/524.4 |

(List continued on next page.)

FOREIGN PATENT DOCUMENTS 0216639  4/1987  European Pat. Off. .

OTHER PUBLICATIONS

Branson, "Series 90 Mini Vibration Welder 109–130–001 Operator's Manual," Branson Plastic Joining, Inc. 1993.

Exxon Chemical, "Escorene UL 00218 MED—Polymer for Health Care."

*Primary Examiner*—Linda Johnson
*Attorney, Agent, or Firm*—Senniger, Powers, Leavitt & Roedel

[57] ABSTRACT

An apparatus for filling and sealing intravenous solution bags in a sterile environment. Each bag has a weldably sealable opening for introducing intravenous solution into the bag. The apparatus includes a generally sealed enclosure defining an enclosed interior space sized and shaped for simultaneously containing a plurality of the intravenous solution bags to prevent contamination of the bags. Further, the apparatus includes an intravenous solution delivery system positioned at least partially inside the interior space of the enclosure for delivering intravenous solution through the openings of the bags to fill the bags while the bags are in the enclosure. In addition, the apparatus includes a welder positioned at least partially inside the interior space of the enclosure for hermetically sealing the openings of the bags after they have been filled with intravenous solution and while they are in the enclosure.

20 Claims, 9 Drawing Sheets

U.S. PATENT DOCUMENTS

| | | | |
|---|---|---|---|
| 4,936,502 | 6/1990 | Schlarb et al. | 228/102 |
| 4,964,261 | 10/1990 | Benn | 53/469 |
| 4,991,633 | 2/1991 | Wong | 141/5 |
| 5,011,555 | 4/1991 | Sager | 156/73.1 |
| 5,129,212 | 7/1992 | Duffey et al. | 53/426 |
| 5,196,079 | 3/1993 | Sager | 156/73.1 |
| 5,382,408 | 1/1995 | Kruger et al. | 53/425 X |
| 5,435,863 | 7/1995 | Franz | 156/64 |
| 5,493,845 | 2/1996 | Adolf et al. | 53/133.2 X |
| 5,606,844 | 3/1997 | Takagaki et al. | 53/DIG. 2 |

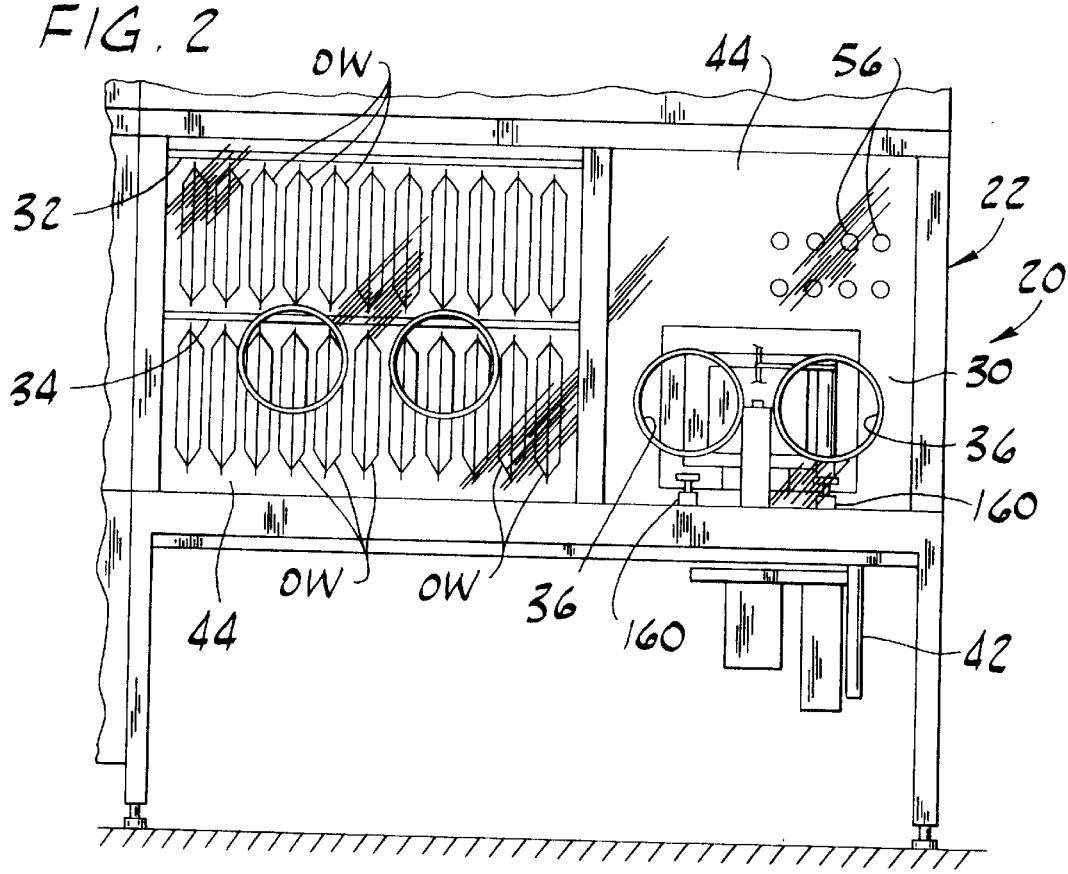
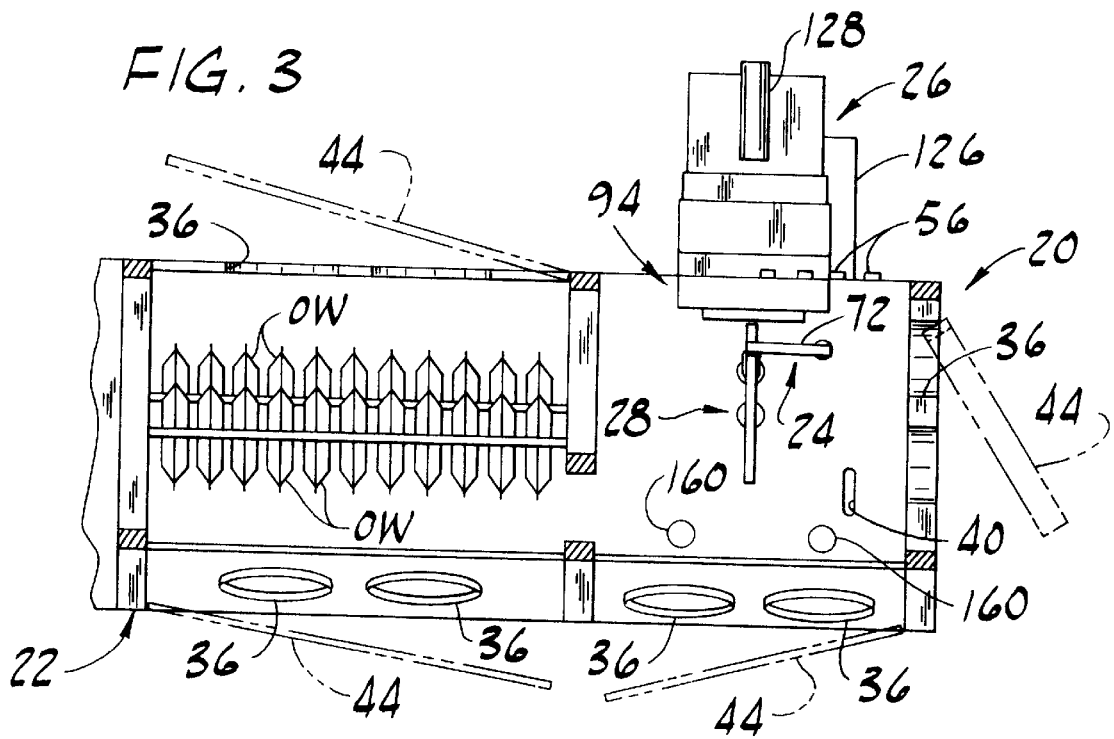

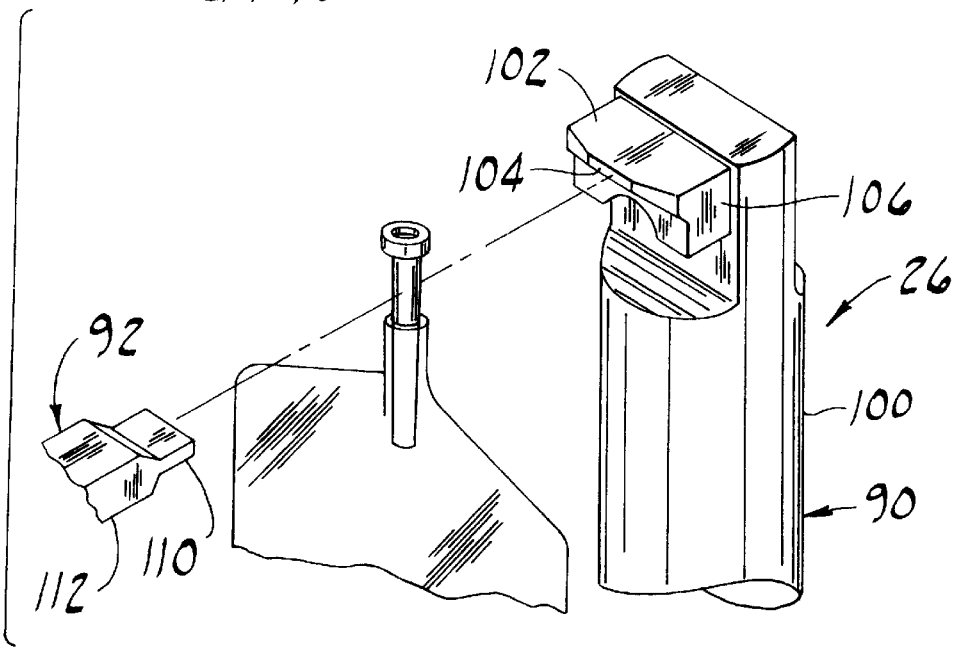
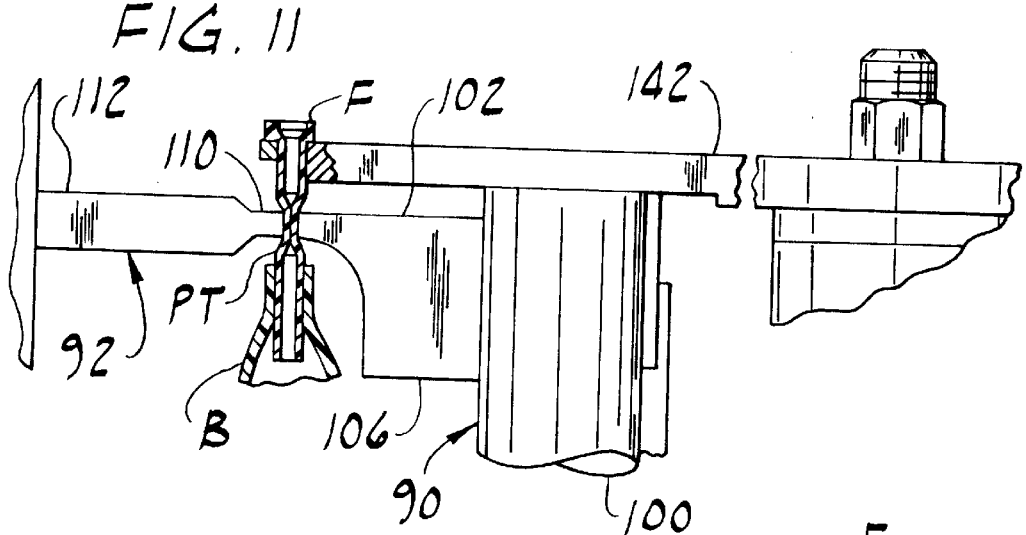
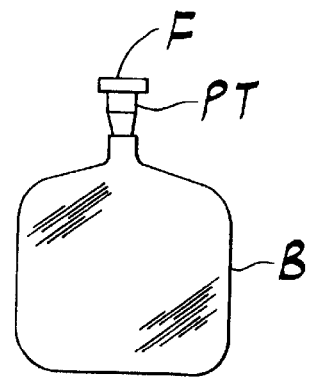

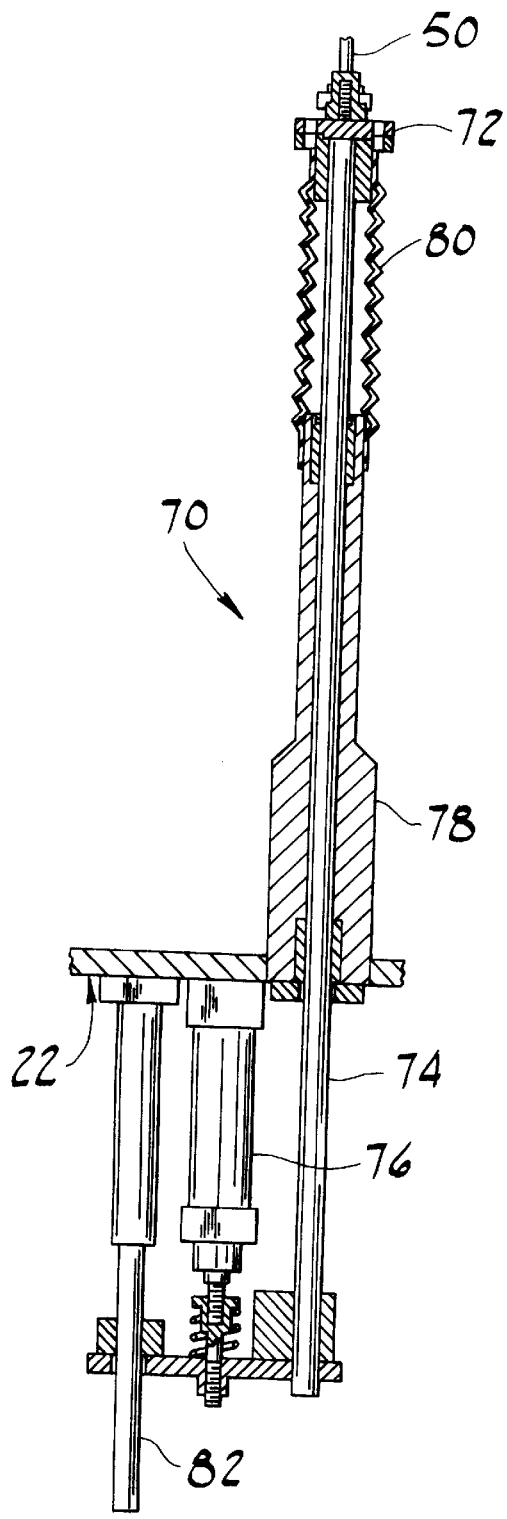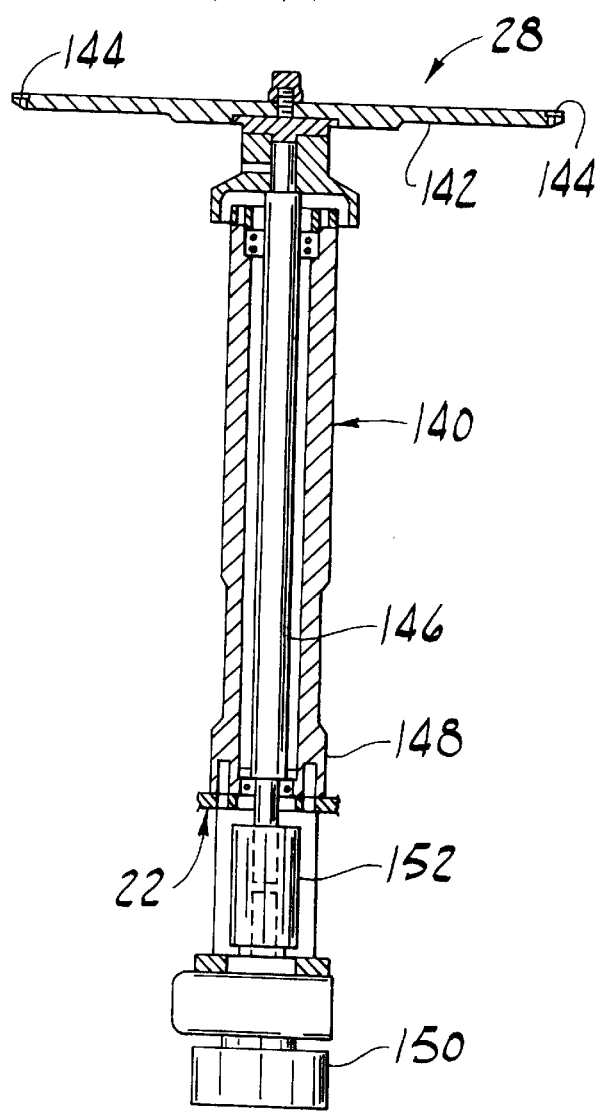

APPARATUS AND METHOD FOR FILLING AND SEALING INTRAVENOUS SOLUTION BAGS

CROSS-REFERENCES TO RELATED APPLICATIONS

This is a continuation-in-part of application Ser. No. 08/595,996, filed Apr. 9, 1996, now abandoned.

BACKGROUND OF THE INVENTION

This invention relates generally to filling and sealing intravenous solution bags and, more particularly, to a method and apparatus for filling intravenous solution bags in a sterile, sealed enclosure and sealing the bags by vibration welding.

Previously, intravenous solution bags have been filled in clean rooms under hoods capable of maintaining sterile conditions within specified limits. The bags are sterilized before being taken into the room to prevent the room from being contaminated, and they are re-sterilized after being filled to ensure sterility of the bag as shipped. However, some solutions are damaged if the bags are sterilized after being filled. Thus, the bags must be processed in a very sterile environment to prevent contamination during the filling and sealing processes so that re-sterilization is not required. Clean rooms capable of maintaining the necessary sterile environment are expensive to build and operate. Further, these rooms are highly inefficient because everything in the room, including any workers, must be sterilized before entering the room.

Conventional intravenous solution bags are made of thermoplastics such as vinyl. Usually, the opening through which the bag is filled is sealed by heating the bag in the vicinity of the opening to a temperature sufficient to melt portions of the bag and then pressing the melted portions of the bag together as they cool to weld the opening shut.

Several methods have been used to heat the bag. One such method is radio frequency welding in which high frequency electromagnetic radiation is directed toward the bag to heat the plastic. If any solution is present on the outside surface of the bag, electrical arcing can occur which may damage the bag and/or the radio frequency welding machine. Another method of sealing the bag is ultrasonic welding in which a portion of the bag is clamped between a sonic horn and an anvil. The horn vibrates against the bag at very high speeds (e.g., 20–40 kHz or more). As the horn vibrates, it moves toward and away from the bag and heats the bag, first at the outside surface and then farther inward. Because the outside surface of the bag is heated first and the inside surface must be melted to weld the opening shut, the bag melts through its entire thickness during ultrasonic welding. Melting weakens the bag and prevents it from being suspended from above the weld. Therefore, the bag must be supported both below the weld to prevent it from rupturing and above the weld to prevent it from spilling. Further, the operating parameters used in ultrasonic welding must be closely controlled or inferior welds are made. Thus, ultrasonic welding is difficult to perform consistently.

SUMMARY OF THE INVENTION

Among the several objects and features of the present invention may be noted the provision of an apparatus which fills and seals intravenous solution bags in a highly sterile environment; the provision of such an apparatus which eliminates the need to post-sterilize the bags; and the provision of such an apparatus which is relatively inexpensive to build and operate.

Briefly, an apparatus of this invention fills and seals intravenous solution bags in a sterile environment. Each bag has a weldably sealable opening for introducing intravenous solution into the bag. The apparatus comprises a generally sealed enclosure defining an enclosed interior space sized and shaped for simultaneously containing a plurality of the intravenous solution bags to prevent contamination of the bags. Further, the apparatus comprises an intravenous solution delivery system positioned at least partially inside the interior space of the enclosure for delivering intravenous solution through the openings of the bags to fill the bags while the bags are in the enclosure. In addition, the apparatus comprises a welder positioned at least partially inside the interior space of the enclosure for hermetically sealing the openings of the bags after they have been filled with intravenous solution and while they are in the enclosure.

In another aspect, the invention includes a method of filling and sealing intravenous solution bags in a sterile environment. The method comprises the steps of enclosing the bags in a generally sealed enclosure, filling the interior chambers of a bag with intravenous solution, and hermetically sealing the opening of the bag by welding the opening closed with a welder while in the enclosure.

Other objects and features of the invention will be in part apparent and in part pointed out hereinafter.

BRIEF DESCRIPTION OF THE DRAWINGS

FIG. 2 is a fragmentary front elevation of the apparatus;

FIG. 3 is a fragmentary horizontal cross section of the apparatus;

FIG. 10 is a fragmentary perspective of the welder and a solution bag;

FIG. 11 is a side elevation of the welder shown welding a bag held by a turntable, with parts shown in partial cross section;

FIG. 12 is a front elevation of an intravenous solution bag;

FIG. 13 is a vertical cross section of a fill nozzle actuator for raising and lowering a filling tube;

FIG. 14 is a vertical cross section of the turntable;

Corresponding reference characters indicate corresponding parts throughout the several views of the drawings.

DETAILED DESCRIPTION OF THE PREFERRED EMBODIMENT

Figure 1:
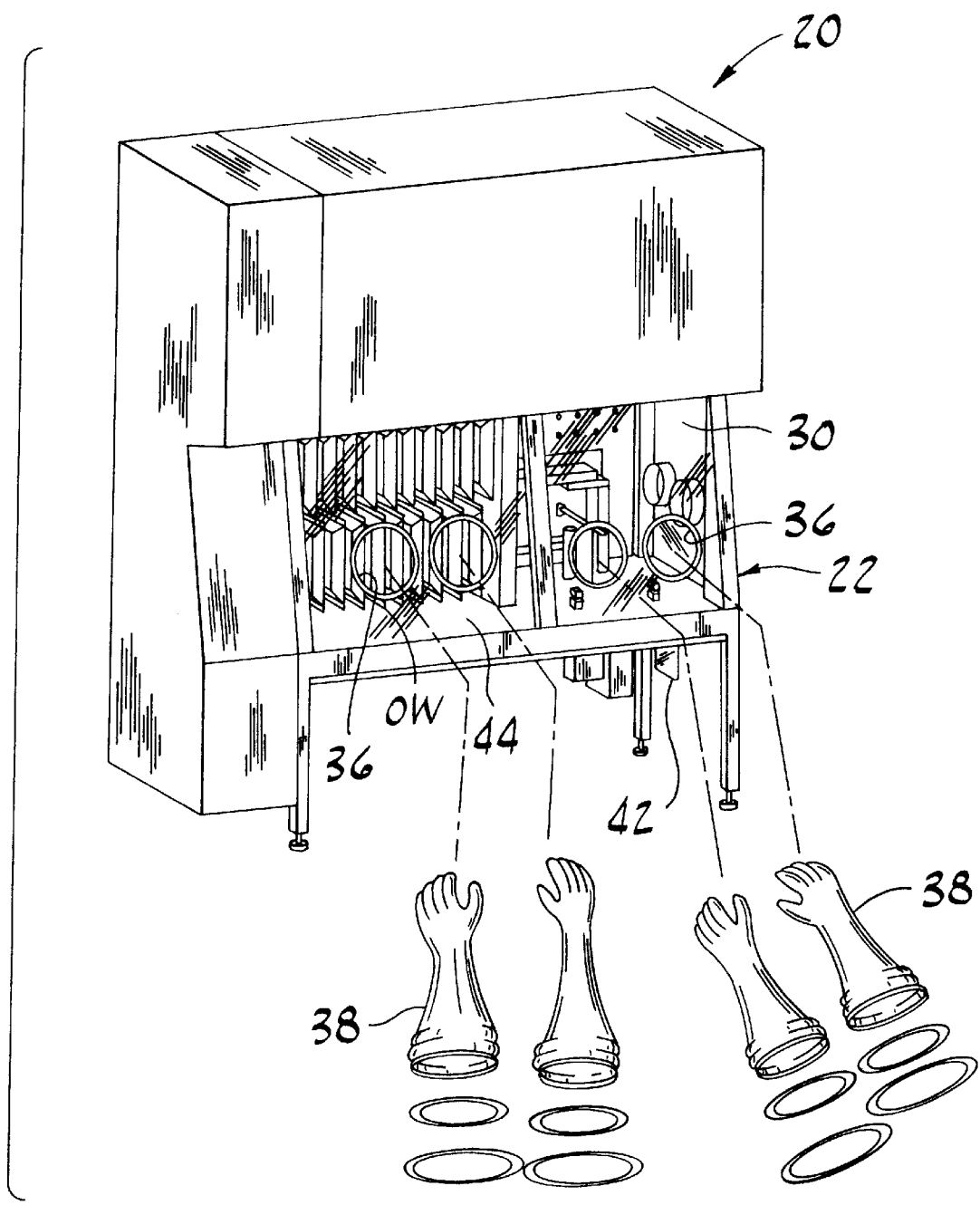
FIG. 1 is a perspective of apparatus for filling and sealing intravenous solution bags.
Figure 5:
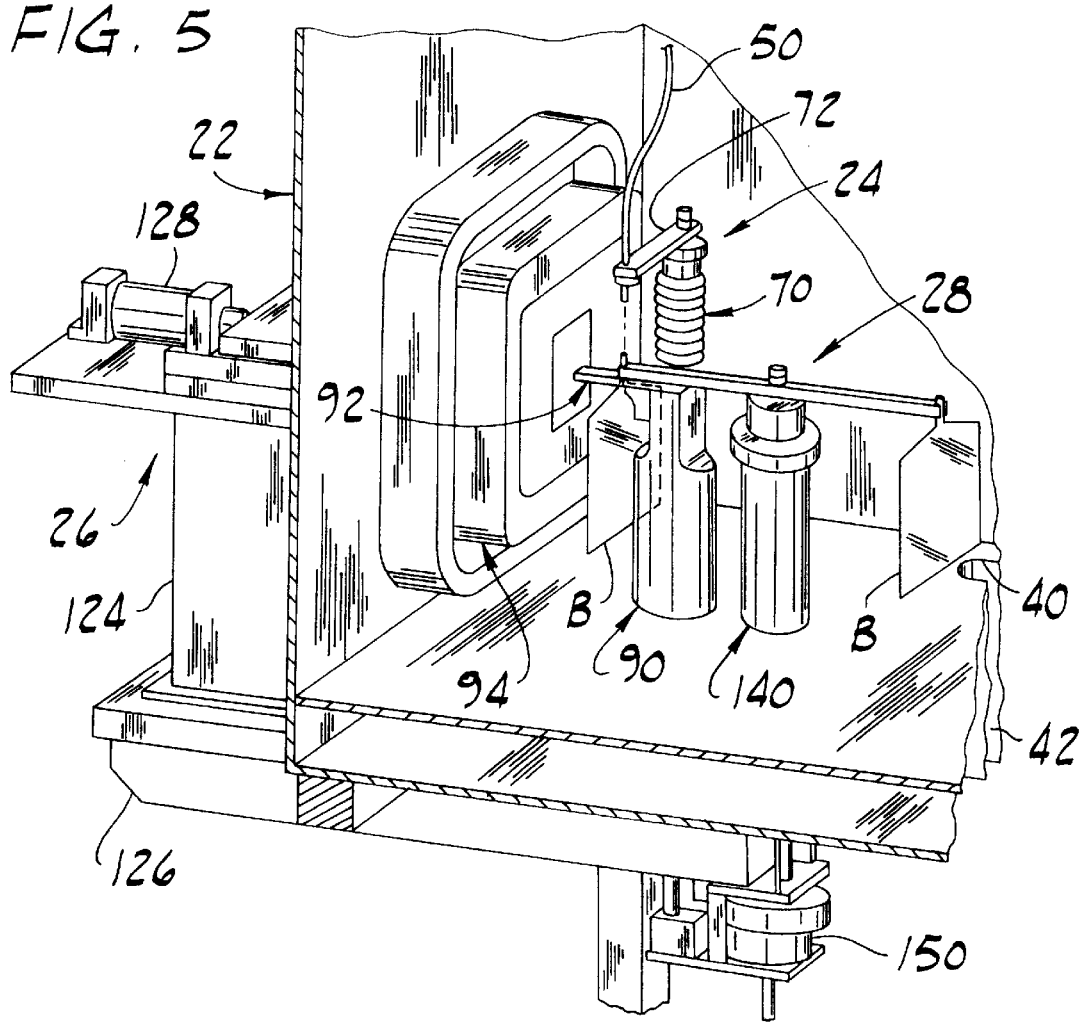
FIG. 5 is a perspective, partially broken away, of the apparatus showing a solution delivery system and a welder.
Figure 6:
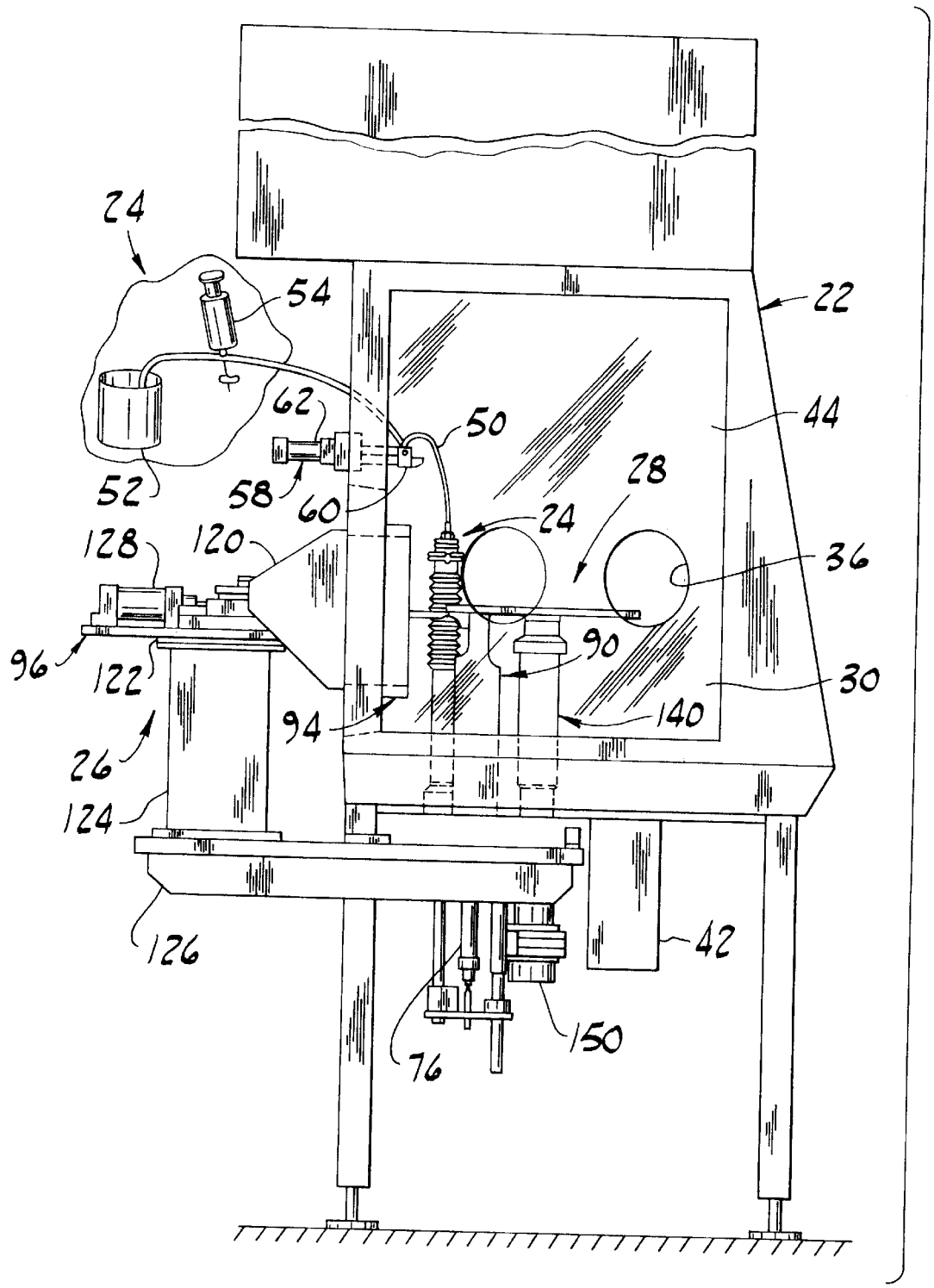
FIG. 6 is a fragmentary side elevation of the apparatus.

Referring now to the drawings and in particular to FIG. 1, an apparatus for filling and sealing intravenous solution bags B (FIG. 5) in a sterile environment is generally designated by the reference numeral 20. As illustrated in FIGS. 5 and 6, the apparatus 20 includes a sealed enclosure (generally designated 22), an intravenous solution delivery system (generally designated 24) to fill the bags B, and a welder (generally designated 26) for hermetically sealing the bags after they have been filled with intravenous solution. The apparatus also includes a transport system, generally designated 28, for transporting each of the bags B between a station where the bag is filled and sealed (i.e., a filling and sealing station) and a station where the bags are removed from the enclosure (i.e., a bag removal station).

Figure 4:
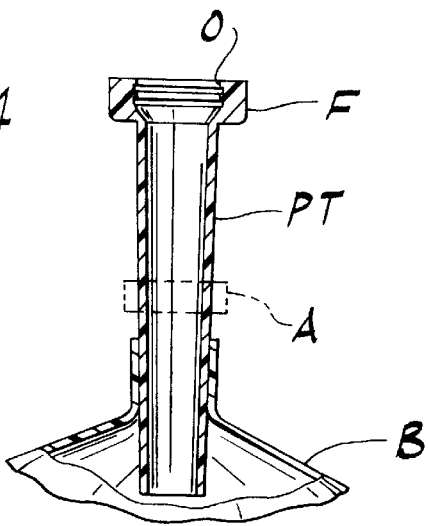
FIG. 4 is a fragmentary front elevation of an upper portion of a solution bag.

The apparatus may be used to fill bags B of the type shown in FIG. 4, for example. The bag B includes a port tube PT having an opening O extending through the tube and a radial flange F at its distal end. The flange F is sufficiently rigid so that the entire bag B may be suspended from the flange when the bag is full. The port tube PT is inserted either manually or mechanically into the bag B and attached to the bag by adhesives or welding prior to placing the bag in the enclosure 22. The port tube PT is preferably constructed of a thermoplastic such as a blend of ethyl vinyl acetate (EVA) and ethylene. For instance, the port tube PT may be made of ESCORENE UL00218MED random EVA copolymer available from Exxon Chemical. ESCORENE is a federally registered U.S. trademark owned by Exxon Corporation of Flemington, N.J. Port tubes PT constructed of ESCORENE copolymer comprise about 12 to about 18 percent EVA and a blend of polyethylene. Alternatively, the bags B may be constructed of blends of polyolefins and butyl rubbers or thermoplastic elastomers such as KRATON elastomers in a 50/50 blend, as known in the prior art. KRATON is a federally registered U.S. trademark owned by Shell Oil Company of Houston, Tex.

Figure 15:
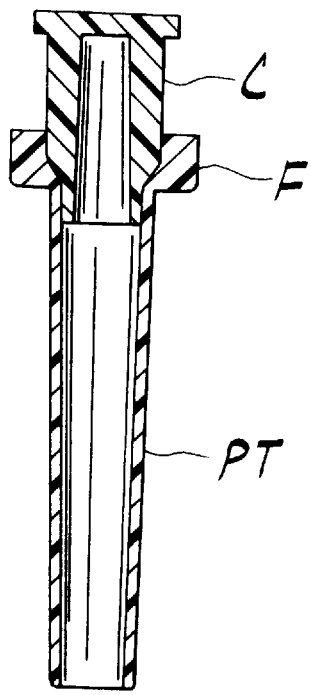
FIG. 15 is a vertical cross section of a port tube and port tube cap of an intravenous solution bag.
Figure 16:
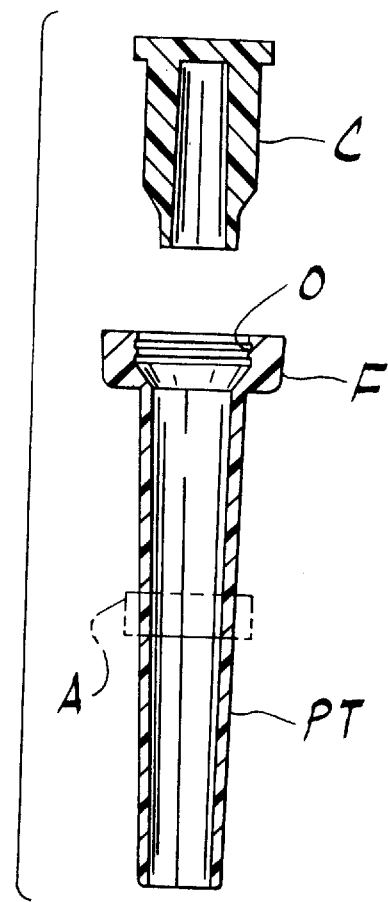
FIG. 16 is a cross section of the tube and cap schematically showing a sealing area of the tube.

Before the bag B is filled and after it is sealed, a cap C may be inserted into the port tube PT and frictionally held in place as shown in FIG. 15. FIG. 16 illustrates the cap C removed from the port tube PT of the bag B. In addition FIG. 16, shows an area A in phantom where the port tube PT is sealed with the welder 26.

As illustrated in FIG. 2, the enclosure 22 defines an enclosed interior space 30 sized and shaped for simultaneously containing a plurality of the intravenous solution bags B (not shown in FIG. 2) to prevent contamination of the bags. Upper and lower racks 32, 34, respectively, extend across a portion of the enclosure 22 for providing a staging area for storing the bags B prior to filling. Each rack has a series of slots (not shown) for receiving the bags. The bags B are stored in individual envelopes or overwrap OW to protect them from contamination before being filled and sealed. Portholes 36 are provided in the walls of the enclosure 22. As illustrated in FIG. 1, flexible rubber gloves 38 are attached by conventional means to the portholes 36 for manipulating bags B and overwrap OW in the enclosure 22. Thus, the gloves 38 form part of the transport system 28 for transporting the bags from the staging area (i.e., the racks 32, 34) to the filling and sealing station. Although stationary racks 32, 34 are used in the preferred embodiment for storing the bags B, other storage means such as conveyors are also envisioned as being within the scope of the present invention.

Air handling equipment (not shown) is housed in the enclosure 22 above the interior space 30 for pressurizing the space with filtered air to prevent contamination from entering the enclosure. Electronic controls (not shown) are housed in the enclosure 22 beside the interior space 30 (to the left as shown in FIG. 1) for controlling operation of the apparatus 20. As illustrated in FIG. 3, a slot 40 extends through the floor of the enclosure 22 defining the interior space 30. Bags B may be dropped through this slot 40 after they are sealed to remove them from the enclosure 22 without opening the enclosure and contaminating its contents. The enclosure 22 may be positioned over a conveyor (not shown) to transport the bags B away from the enclosure after they have dropped through the slot 40.

As illustrated in FIG. 2, a tubular chute 42 extends down from the slot 40 to prevent contamination from entering the interior space 30 as bags B fall through the slot. It will be noted in this regard that as a bag B falls through the slot 40, the air pressure decreases immediately above the bag due to aerodynamic effects. This pressure decrease might draw contaminated air into the enclosure 22 if the chute 42 were not present. The chute 42 acts as a physical barrier to prevent air outside the enclosure 22 from backflowing into the interior space 30 as the bag B falls through the slot 40. The positive air pressure in the interior space 30 also ensures that the space is not contaminated.

Although other materials may be used to construct the enclosure 22 without departing from the scope of the present invention, the enclosure of the preferred embodiment is primarily constructed of stainless steel and has glass doors 44 to permit operators to view the bags B in the enclosure. As illustrated in phantom in FIG. 3, the doors 44 are mounted on hinges (not shown) so they can be swung open before and after each production run to load bags B in their individual overwraps OW and unload spent overwrap OW after a batch is completed as will be explained in greater detail below. At the beginning of each production run, bags B are loaded into the racks 32, 34 through the open doors 44, the doors are closed, and the interior space 30 is sterilized using a hydrogen peroxide spray.

The intravenous solution delivery system 24 is positioned at least partially inside the interior space 30 of the enclosure 22. As illustrated in FIG. 6, the solution delivery system 24 includes a filling tube 50 for filling bags B with intravenous solution. A sealed receptacle 52 is connected to the filling tube 50 outside the enclosure 22 for holding a supply of intravenous solution, and an automatic or manual syringe pump 54 is positioned along the filling tube for delivering a predetermined amount of solution from the receptacle to an awaiting bag B (FIG. 5). The filling tube 50 enters the enclosure 22 through one of eight conventional connectors 56 (FIG. 2) positioned on the back wall of the enclosure. As further illustrated in FIG. 6, a pinch-and-draw valve, generally designated 58, is positioned between the pump 54 and the outlet (i.e., lower end) of the filling tube 50 for controlling flow of solution through the filling tube.

Figure 8:
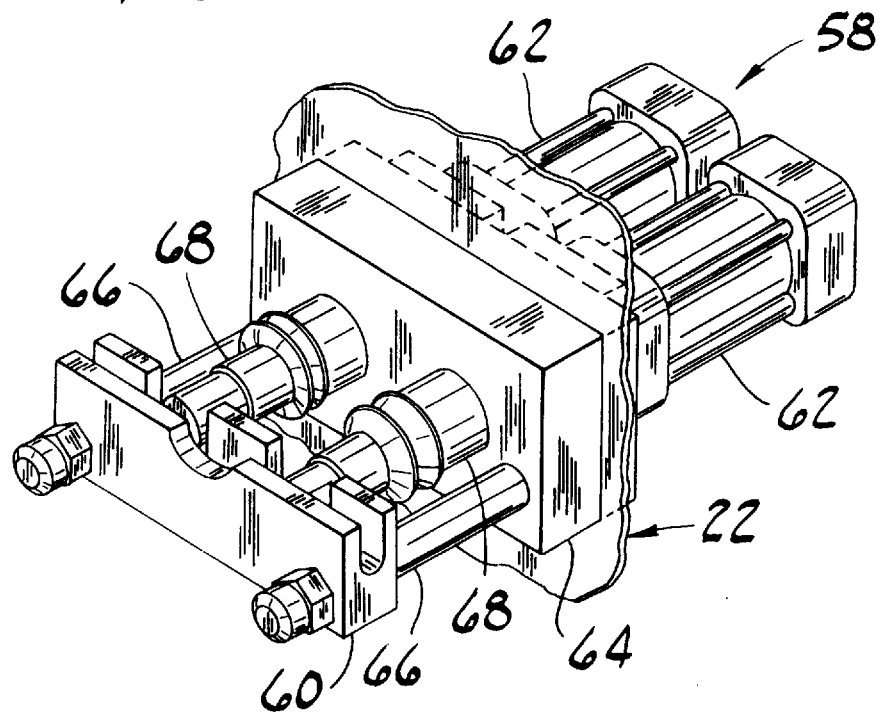
FIG. 8 is a perspective of a pinch-and-draw valve for controlling solution delivery to the bag.
Figure 9:
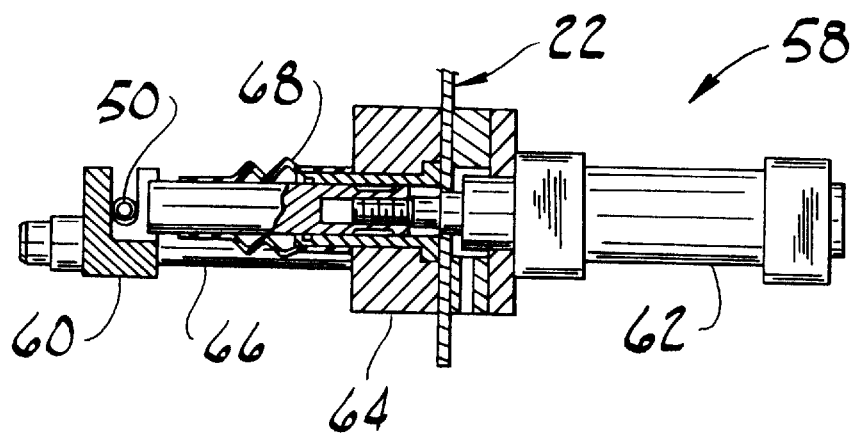
FIG. 9 is a vertical cross section of the valve.

As illustrated in FIGS. 8 and 9, the pinch-and-draw valve 58 comprises a channel member 60 which holds the filling tube 50, and two pneumatic actuators 62 which extend to pinch the filling tube against the channel member to prevent flow through the filling tube and retract to permit flow through the filling tube. When solution is dispensed from the receptacle 52 by the syringe pump 54, both actuators 62 of the pinch-and-draw valve 58 are retracted to permit flow through the filling tube 50. After the pump piston is completely compressed, thereby forcing the predetermined amount of solution through the tube 50 to an awaiting bag B, both actuators 62 are extended to pinch the tube and stop flow through the tube. Once flow is stopped, the downstream actuator 62 is retracted, allowing the corresponding pinched portion of tubing 50 to expand for drawing a small portion of the solution up the filling tube to ensure that the meniscus at the outlet of the tube is concave so solution does not drip from the tube. The actuators 62 are attached to the enclosure by a mounting block 64. Threaded rods 66 extend from the block 64 into the interior space 30 for holding the channel member 60 in position relative to the actuators 62. Elastomeric boots 68 surround the actuators 62 to seal against contamination of the enclosure 22.

As illustrated in FIG. 5, an insertion mechanism, generally designated 70, is provided to raise and lower the filling tube 50 relative to the bag B. The filling tube 50 is held by a holder 72 which is attached to a vertical rod 74 as illustrated in FIG. 13. The rod 74 is connected to a pneumatic actuator 76 mounted below the enclosure 22 for moving the holder 72 and filling tube 50 up and down relative to the bag B. The arrangement is such that when the actuator 76 extends, the filling tube 50 is lowered into the bag B, and when it retracts, the filling tube is raised out of the bag. A housing 78 surrounds the rod 74 to guide it up and down, and an elastomeric bellows 80 extends between the housing 78 and the holder 72 to seal against contamination of the enclosure 22. A second rod 82 extending down from the enclosure 22 guides the actuator 76 to prevent it from bending. This configuration also prevents the rod 74 from turning so the filling tube 50 remains aligned with the bag B.

Figure 7:
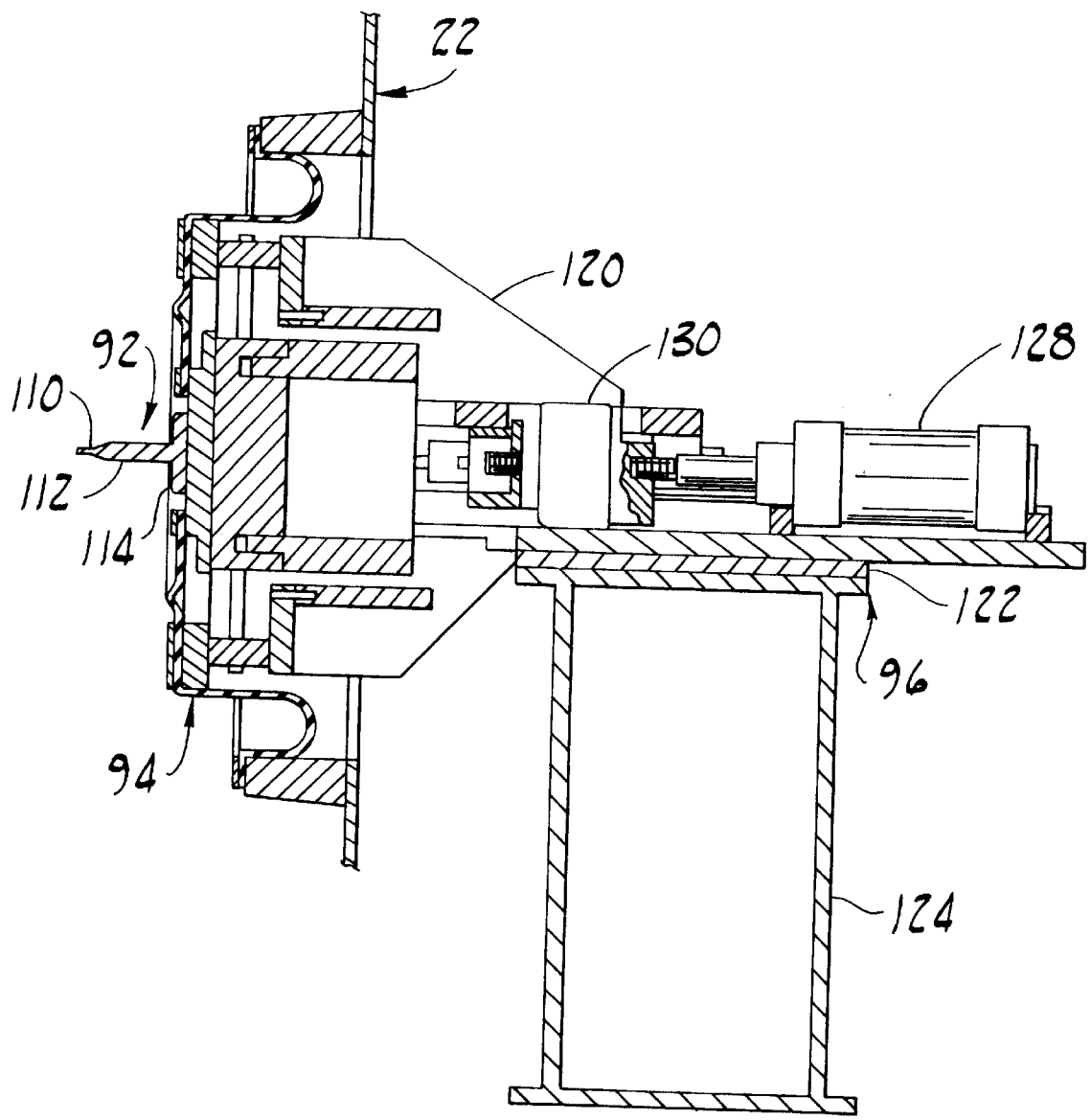
FIG. 7 is a vertical cross section of the welder.

As illustrated in FIG. 10, the welder 26, which hermetically seals the bags after they have been filled with intravenous solution, comprises an anvil (generally designated 90), a sealing head (generally designated 92), a vibrator mechanism (generally designated 94 in FIG. 7) which vibrates the sealing head transversely (i.e., in and out of the page as shown in FIG. 7) with respect to the anvil, and a slider mechanism (generally designated 96 in FIG. 7) which moves the sealing head and the vibrator mechanism toward and away from the anvil to permit a port tube PT of a bag B to be inserted into and removed from the filling and sealing station. As illustrated in FIG. 10, the anvil 90, comprises a rigid, steel shaft 100 having a hardened body 102 extending laterally from an upper end of the shaft. The shaft 100 is rigidly attached to the floor of the enclosure 22 as shown in FIG. 5. As will be apparent to those skilled in the art, the size and shape of the anvil 90 may vary without departing from the scope of the present invention. However, the anvil 90 of the preferred embodiment has a sealing surface 104 which is about 0.125–1.0 in. high and about 1.0–1.25 in. wide. The sealing surface 104 is knurled to grip the bag B and provide improved sealing characteristics. The body 102 of the preferred embodiment has a base 106 which is approximately 1.5625 in. thick, 2.0 in. high, and 2.75–3.0 in. wide.

As will be apparent to those skilled in the art, the size and shape of the sealing head 92 may also vary without departing from the scope of the present invention. However, as illustrated in FIGS. 10 and 11, the sealing head 92 of the preferred embodiment has a tip portion 110 which is approximately 0.10–0.25 in. high, and most preferably about 0.142 in. high. The tip portion 110 of the preferred embodiment is approximately 0.10–0.25 in. long, and most preferably is about 0.125 in. long. The tip portion 110 flares outward over a length of about 0.25 in. The edges of the tip portion 110 are rounded to prevent it from puncturing or cutting a bag B during sealing. The sealing head 92 also includes a main portion 112 which in the preferred embodiment is about 2.5 in. long and about 0.3125 in. high. As illustrated in FIG. 7, the sealing head 92 also has a base portion 114 which in the preferred embodiment is about 0.25–0.5 in. thick and about 1.0–2.5 in. wide. The main portion 112 of the sealing head 92 extends from the center of the base portion 114. As shown in charts provided in the appendix, a variety of sizes of sealing heads may be used.

The vibrator mechanism 94 (e.g., a Branson Series 90 Mini-Vibration Welder) vibrates the sealing head 92 transversely with respect to the anvil 90 (i.e., in and out of the page as shown in FIG. 7) to seal the bag B in area A of the port tube PT. As shown in FIG. 7, the vibrator mechanism 94 is mounted on a carriage 120 which in turn is mounted on the slider mechanism 96 having one or more platforms 122 connected by linear bearings (not shown) to permit extension and retraction of the sealing head 92 with respect to the anvil 90. The platforms 122 are arranged on a pedestal 124 which extends up from a shelf structure 126 attached to the back of the enclosure 22. A pneumatic actuator 128 mounted on the pedestal 124 and connected to the carriage 120 moves the sealing head 92 and vibrator mechanism 94 toward and away from the anvil 90. An air bladder 130 is positioned between the carriage 120 and the actuator 128. This bladder 130 compresses as the bag B is gripped between the sealing head 92 and the anvil 90. When the bladder 130 is compressed a predetermined amount corresponding to a desired tool pressure on the bag, a trigger switch (not shown) closes to signal the vibrator mechanism 94 to begin vibrating the sealing head 92. As the sealing head 92 vibrates, it generates heat in area A between the inside surfaces of the port tube PT. When the heat becomes great enough, the tube melts. After the vibrator mechanism 94 stops vibrating, pressure is maintained between the sealing head 92 and anvil 90 for a predetermined dwell interval, so the port tube PT is hermetically sealed as it cools.

In the preferred embodiment, the sealing head 92 vibrates at a frequency of about 200 Hertz to 300 Hertz and at an amplitude of about 0.070 in. peak to peak, plus or minus 0.002 in. for approximately 1–2 seconds. Further, a pressure of about 40 to 70 pounds per square inch is applied to the bag. The bag B is permitted to cool for about 1 second plus or minus a half second before the pressure is released and the bag is transferred to the removal station. A gap of no less than about 0.004 in. is maintained between the sealing head 92 and the anvil 90 during welding. One of the advantages of the present invention is that vibration welding is very forgiving, so that, for example, a weld time of six seconds may be utilized without burning or puncturing of the bag B. The port tube PT is preferably sealed while the filling tube 50 is in the port tube PT.

In order to verify the efficacy of the previously-described apparatus 20 for sealing bags B, a series of tests were conducted varying the sealing parameters. The results of these tests are provided in the appendix. As shown in the charts provided in the appendix, the previously described pressure and dwell times provide strong hermetic seals in port tubes PT made of the previously described materials.

As illustrated in FIG. 5, the transport system 28 of the preferred embodiment includes a turntable, generally designated 140, provided in the enclosure 22. As further illustrated in FIG. 14, the turntable 140 includes an arm 142 having an aperture or slot 144 at each end for holding bags B. The arm 142 is fastened to a shaft 146 which is rotatably held by a tubular housing 148 attached to the floor of the enclosure 22. The shaft 146 is turned for rotating the arm 142 by means of a drive connected to the bottom of the shaft by a coupling 152. The drive may comprise a rotary actuator 150 such as a FESTO Rotary Actuator. In an alternative embodiment, not shown in the drawings, the transport system 28 may comprise a conventional conveyor.

To use the apparatus 20 described above, the glass doors 44 are opened and empty intravenous solution bags B in individual overwrap OW are loaded in the racks 32, 34 on the left side of the enclosure 22 (as viewed in FIGS. 1–3).

The bags B may be sterilized before being loaded into the enclosure 22, or they may be sterilized while in the enclosure. In a preferred embodiment, the bags B are pre-sterilized by gamma radiation in the overwrap OW or sealed trays (not shown) before being loaded into the enclosure 22.

Once the bags B are loaded, the doors 44 are closed and the interior space 30 is sterilized by spraying a sterilizing agent such as hydrogen peroxide, ethylene oxide or other chemical or commonly known gaseous sterilization agents into the interior space. In order to maintain sterility, sterile air is blown into the enclosure 22 by the air handling equipment housed above the interior space 30.

A first operator places his or her hands in a pair of gloves 38 in front of the racks 32, 34. This operator removes a bag B from one of the racks and removes the overwrap OW from the bag. Although other provisions may be made for the spent overwrap OW, in the most preferred embodiment the overwrap is simply discarded on the floor of the enclosure 22 until after the entire batch of bags in the enclosure is processed. A second operator places his or her hands in a second pair of gloves 38 in front of the turntable 140. The first operator hands the unwrapped bag B to the second operator who finishes processing this bag, so the first operator is free to remove the next bag B to be filled and sealed from the overwrap OW. The second operator suspends the bag B from the turntable 140 by inserting the port tube PT of the bag into the slot 144 on the closer end of the turntable arm 142 so the flange F of the bag is above the arm.

Once the bag is suspended from the turntable, the second operator simultaneously presses two palm buttons 160 (FIG. 2) on the floor of the enclosure 22 for a predetermined period of time (e.g. two seconds). When the palm buttons have been pressed for the predetermined period of time, the controller mounted in the left portion of the enclosure 22 signals the rotary actuator 150 to spin the turntable 180° to position the port tube PT of the bag B below the filling tube 50 and between the anvil 90 and the sealing head 92 of the welder 26. The controller next signals the actuator 76 of the insertion mechanism 70 to lower the filling tube 50 into the port tube PT of the bag B, following which the controller opens the pinch-and-draw valve 58 to dispense a predetermined amount of intravenous solution delivered by the syringe pump 54 into the bag B. Both actuators 62 of the valve 58 then close and the downstream actuator opens to draw a small amount of solution up into the filling tube to prevent dripping.

The controller next signals the actuator 124 on the welder 26 to slide the sealing head 92 toward the anvil 90 to pinch the port tube PT of the bag B at area A. When the predetermined amount of pressure is achieved between the port tube PT, sealing head 92 and anvil 90, the bladder 126 compresses sufficiently to close the trigger switch (not shown) and the vibrator mechanism 94 vibrates the sealing head 92 transversely relative to the anvil 90. The vibration causes heat to generate between the inside surfaces of the port tube PT so the inside of the port tube melts. After a predetermined period of time, the vibrator mechanism 94 stops moving and the pressure between the sealing head 92 and the anvil 90 is maintained until the melted portion of the port tube PT in area A is sealed.

Once the bag B is sealed, the actuator 124 is retracted to slide the sealing head 92 away from the anvil 90, and the actuator 76 on the insertion mechanism 70 is retracted to raise the filling tube 50 out of the port tube. After the second operator has loaded the next bag B to be filled and sealed on the other end of the arm 142 and has again pressed the palm buttons 150, the turntable turns 180° to fill and seal the next bag. When the turntable 140 turns, it returns the filled and sealed bag to a position near the operator's gloved hands, where he or she may cap the bag B and remove it from the slot 144 in the turntable arm 142. The operator then drops the bag through the slot 40 in the floor of the enclosure 22 where it can be transported to another location for further processing and shipment. Alternatively, the second operator may pass the bag back to the first operator who may load the filled bag back into one of the racks 32, 34. When all of the bags have been filled and sealed, the doors 44 are opened and the spent overwrap OW is removed prior to beginning the next batch of bags.

As an additional feature of the invention, a check weigher may be provided either attached to arm 142 or as a separate station within the enclosure 22 for precisely controlling the weight and therefore the volume of each bag B.

In view of the above, it will be seen that the several objects of the invention are achieved and other advantageous results attained. In particular, the apparatus and method described above enables intravenous solution bags to be filled and sealed inside a comparatively inexpensive enclosure 22 rather than in an expensive clean room. Further, the apparatus and method eliminates the need for post-processing sterilization which can damage the solution in the bags. In addition, because vibration welding is used, rather than ultrasonic welding, the bag is not melted through its entire thickness. Thus, the bag may be suspended from above during processing, and the process is not as sensitive to variations in operating parameters. Still further, since the bags are suspended by their port tubes, a variety of different size bags may be processed without changing the mechanical settings of the device, as long as the port tubes are substantially uniform.

As various changes could be made in the above constructions without departing from the scope of the invention, it is intended that all matter contained in the above description or shown in the accompanying drawings shall be interpreted as illustrative and not in a limiting sense.

APPENDIX

2ND GENERATION VIBRATION WELDER PROTOTYPE
(AIR BLADDER/PNEUMATIC)

Subject BURST TEST STRENGTH OF 18%EVA vs. 18%/12% 50%-50%. BLEND PORT TUBES WELDED WHILE EXTERNAL WEIGHT PULLS ON SEAL. USE WIDE AND NARROW WIDTH HORNS Weld Parameters:  Weld Time 1.6 seconds
                 Cool Time 1.0 seconds
                 Knurl Horn and Anvil
                 Horn/Anvil Gap .004"
                 Bladder Air Pressure 70 PSIG
                 Narrow, Long Horn Method:
    Dip the port tube in water to wet.
    Clamp a Vise Grip plier with auxiliary weight, having a total accumulated weight of 2.2 pounds or 1 kilogram, to the small end of the port tube.
    Hang the port tube assembly in anvils' part holding fixture.

Weld fifteen port tubes of 18% EVA Material with the Wide, Long Horn
    Weld fifteen port tubes of the 1%/18% 50%/50% Blend Material with the Wide, Long Horn.
    Weld fifteen port tubes of 18% EVA Material with the Narrow, Long Horn.
    Weld fifteen port tubes of the 18%/12% 50%/50% Blend Material with the Narrow Long Horn.

Freeze parts for a minimum of 48 hours.
    Thaw and burst test.
    Record the results.

Definitions:

| | | |
|---|---|---|
| WF | WELD FRACTURE | The hydraulic pressure of the water has torn through and delaminated the weld. |
| WFW WEEP | WELD FRACTURE | The hydraulic water pressure has allowed small capillary flow through the weld; producing water weep. |
| PD | PARTIAL DELAMINATION | The weld has started to delaminate along the inner seal but has not fractured through the weld. |
| SW - | SIDE WALL BURST | The burst pressure was strong enough to balloon out and burst the side, port tube wall. Sometimes accompanied by Partial Delamination. |
| SC - | SEAL CUT | The failure of the port tube wall on the solution side of the seal during burst; due to its' being weakened by the exaggerated penetration of the sharp or serrated, lower edge of the horn. |

A-1

RUN 1

Port Tube Manufacturer: Baxter Healthcare Mold Shop RLT-10
Port Tube Material: Escorene Ultra EVA
Weld Time- 1.6 sec.
Cool Time: 1.0 sec.
Cylinder Pressure 125 PSIG
Bladder Pressure: 70 PSIG
Knurling: Horn and Anvil (did not want to remove anvil knurling for this test)
Horn Width: NARROW

| Port Port Tube No | Initial Displayed Pressure (PSI) | Rupture Pressure (PSI) | No Burst Pressure (PSI) | Burst Pressure (PSI) | Actual Burst Pressure (PSI) |
|---|---|---|---|---|---|
| 1 | 2 | 203 | 203 | | 201 SC |
| 2 | 2 | 210 | 210 | | 208 SC |
| 3 | 2 | 211 | 211 | | 209 SC |
| 4 | 2 | 214 | 214 | | 212 SC |
| 5 | 2 | 207 | 207 | | 205 SC |
| 6 | 2 | 211 | 211 | | 209 SC |
| 7 | 2 | 247 | 247 | | 245 SC |
| 8 | 2 | 207 | 207 | | 205 SC |
| 9 | 2 | 225 | 225 | | 223 SC |
| 10 | 2 | 232 | 232 | | 230 SC |
| 11 | 2 | 247 | 247 | | 245 SC |
| 12 | 2 | 218 | 218 | | 216 SC |
| 13 | 2 | 232 | 232 | | 230 SC |
| 14 | 2 | 211 | 211 | | 209 SC |
| 15 | 2 | 222 | 222 | | 220 SC |

Mean Burst Pressure = 217.8 mean 217.8
sum x 3267
sum x squared 714337
sample standard deviation 14.103

RUN 2
Port Tube Manufacturer: STEDIM
Port Tube Material: 18%X12% EVA 50%/50%. Blend
Weld Time: 1 6 sec.
Cool Time: 1.0 sec.
Cylinder Pressure: 125 PSIG
Bladder Pressure: 70 PSIG
Knurling: Horn and Anvil (did not want to remove anvil knurling for the 5 test)
Horn Width: NARROW

| Port Port Tube No | Initial Displayed Pressure (PSI) | Rupture Pressure (PSI) | No Burst Pressure (PSI) | Burst Pressure (PSI) | Actual Burst Pressure (PSI) |
|---|---|---|---|---|---|
| 1 | 2 | 239 | | 239 | 237 SW |
| 2 | 2 | 236 | | 234 | 234 SW |
| 3 | 2 | 251 | 251 | | 249 SC |
| 4 | 2 | 243 | 243 | | 241 SC |
| 5 | 2 | Damaged in test fixture | | | |
| 6 | 2 | 236 | 236 | | 234 SC |
| 7 | 2 | 228 | 228 | | 226 SC |
| 8 | 2 | 240 | | 240 | 238 SW |
| 9 | 2 | 273 | | 273 | 271 SW |
| 10 | 2 | 232 | | 232 | 231 SW |
| 11 | 2 | 218 | | 218 | 216 SW |
| 12 | 2 | 225 | 225 | | 223 SC |
| 13 | 2 | 228 | | 228 | 226 SW |
| 14 | 2 | 232 | | 232 | 230 SW |
| 15 | 2 | 232 | | 232 | 230 SW |

Mean Burst Pressure = 234.7 sum 3286
n 14
sm x squared 773546
mean 234.7
sample standard deviation 13.228

RUN 3
Port Tube Manufacturer: Baxter Healthcare Mold Shop RLT-10
Port Tube Material: Escorene Ultra EVA
Weld Time: 1.6 sec.
Cool Time: 1.0 sec.
Cylinder Pressure: 125 PSIG
Bladder Pressure: 70 PSIG
Knurling: Horn and Anvil (did not want to remove anvil knurling for this test)
Horn Width: NARROW

| Port Port Tube No | Initial Displayed Pressure (PSI) | Rupture Pressure (PSI) | No Burst Pressure (PSI) | Burst Pressure (PSI) | Actual Burst Pressure (PSI) |
|---|---|---|---|---|---|
| 1 | 2 | 203 | 203 |  | 201 SC |
| 2 | 2 | 210 | 210 |  | 208 SC |
| 3 | 2 | 211 | 211 |  | 209 SC |
| 4 | 2 | 214 | 214 |  | 212 SC |
| 5 | 2 | 207 | 207 |  | 205 SC |
| 6 | 2 | 211 | 211 |  | 209 SC |
| 7 | 2 | 247 | 247 |  | 245 SC |
| 8 | 2 | 207 | 207 |  | 205 SC |
| 9 | 2 | 225 | 225 |  | 223 SC |
| 10 | 2 | 232 | 232 |  | 230 SC |
| 11 | 2 | 247 | 247 |  | 245 SC |
| 12 | 2 | 218 | 218 |  | 216 SC |
| 13 | 2 | 232 | 232 |  | 230 SC |
| 14 | 2 | 211 | 211 |  | 209 SC |
| 15 | 2 | 222 | 222 |  | 220 SC |

Mean Burst Pressure = 217.8 sum x 3267
sum x squared 714337
mean 217.8
sample standard deviation 14.103

RUN 4
Port Tube Manufacturer: STEDIM
Port Tube Material: 18%/12% EVA  50%/50% Blend
Weld Time: 1.6 sec.
Cool Time: 1.0 sec.
Cylinder Pressure: 125 PSIG
Bladder Pressure: 70 PSIG
Knurling:  Horn and Anvil (did not want to remove anvil knurling for this
           test)
Horn Width: WIDE

| Port Port Tube No | Initial Displayed Pressure (PSI) | Rupture Pressure (PSI) | No Burst Pressure (PSI) | Burst Pressure (PSI) | Actual Burst Pressure (PSI) |
|---|---|---|---|---|---|
| 1 | 2 | 240 |  | 240 | 238 SW |
| 2 | 2 | 251 |  | 251 | 249 SW |
| 3 | 2 | 239 |  | 239 | 237 SW |
| 4 | 2 | 236 | 236 |  | 234 SC |
| 5 | 2 | 240 |  | 240 | 238 SW |
| 6 | 2 | 240 |  | 240 | 238 SW |
|  | 2 | 239 |  | 239 | 227 SW |
|  | 2 | 239 |  | 239 | 237 SW |
|  | 2 | 239 |  | 239 | 237 SW |
|  | 2 | 239 |  | 239 | 237 SW |
|  | 2 | 236 |  | 236 | 234 SW |
| 2 | 2 | 243 |  | 243 | 241 SW |
| 13 | 2 | 251 |  | 251 | 249 SW |
| 14 | 2 | 251 |  | 251 | 249 SW |
| 15 | 2 | 239 |  | 239 | 237 SW |

Mean Burst Pressure = 239.5 sum x 3592
sum x squared 860542
mean 239.5
sample standard deviation 5.194

Results:

Material: Escorene Ultra EVA
Horn:                       NARROW              WIDE
Mean Burst Pressure:        284.5               217.8
                            100% SC             100% SC Material: 18%/12% EVA    50%/50% Blend
Horn Width:              NARROW                 WIDE
Mean Burst Pressure:     234.7                  239.5
                         64% SW                 93% SW
                         36% SC                 7% SC

VIBRATION WELDER PROTOTYPE
(PNEUMATIC/AIR BLADDER)

Subject: STATISTICAL RESULTS - FIRST SCREENING STUDY
Statistical Results from the Applied Sciences Group at Baxter
Round Lake - William Graham Building Regarding the First Screening Study using the Short Sonic Horn.

Results:

Goal was to:   1) Maximize Burst Pressure Mean
               2) Minimize Burst Pressure Standard Deviation Key to both above objectives was to:   Maximize Total Weld Time
                       i.e. 1.2 seconds Marginal improvement on Mean and Significant (statistically but probably not practically) Improvement of Standard Deviation by 1) Maximizing Weld Time Proportion > 0.5
               2) Maximizing Trigger Pressure, P  ex. 70 psi There is a very marginal improvement of both the mean and SD gained by:
               Minimizing Trigger Pressure, P Cool time is not important at all.

A-7

VIBRATION WELDER PROTOTYPE
(PNEUMATIC/AIR BLADDER)

Subject: BLADDER GAGE PRESSURE VS. FORCE PRODUCED

MEASURED BLADDER LENGTHS

Measured Uncompressed Bladder Length = 2-7/16" = 2.4375"
Measured Compressed Bladder Length = 2-3/16" = 2.1875"

CONSTANT PRESSURE CHARACTERISTICS
(taken from Data Sheet on Air Spring Model IS3-013)

| Bladder Height | Bladder Pressure | Force Produced | Calculated Cross-sectional Area |
|---|---|---|---|
| 1.5 " | 20 lb/in$^2$ | 125 lbs | 6.25 in$^2$ |
| | | delta = 10 | delta = .5 |
| --- 2.0 " | 20 lb/in$^2$ | 115 lbs | 5.75 in$^2$ |
| Operating Range | | delta = 10 | delta = .5 |
| --- 2.5 " | 20 lb/in$^2$ | 105 lbs | 5.25 in$^2$ |
| | | delta = 15 | delta = .75 |

A-8

Interpolated Force over the linear range at a Bladder Pressure of 20 PSI.

| Bladder Height | Bladder Pressure | Force Produced | Calculated Cross-sectional Area |
|---|---|---|---|
| * 2.0 " | 20 lb/in$^2$ | 115 lbs | 5.75 in$^2$ |
| 2.1 " | 20 lb/in$^2$ | 113 lbs | 5.65 in$^2$ |
| 2.2 " | 20 lb/in$^2$ | 111 lbs | 5.55 in$^2$ |
| 2.3 " | 20 lb/in$^2$ | 109 lbs | 5.45 in$^2$ |
| 2.4 " | 20 lb/in$^2$ | 107 lbs | 5.35 in$^2$ |
| * 2.5 " | 20 lb/in$^2$ | 105 lbs | 5.25 in$^2$ |

* Given Values from Data Sheet.

y-intercept = 155 lbs
slope = -20
Force at 2.1875" height = 111.25 lbs

Force = -20(height) + 155

CONSTANT PRESSURE CHARACTERISTICS
(taken from Data Sheet on Air Spring Model IS3-013)

| Bladder Height | Bladder Pressure | Force Produced |
|---|---|---|
| 2.0" | 30 psi | 180 lb |
| 2.5" | 30 psi | 170 lb |
| * 2.0" | 40 psi | 230 lb |
| * 2.5" | 40 psi | 220 lb |
| 2.0" | 50 psi | 290 lb |
| 2.5" | 50 psi | 290 lb |

| Height | Bladder Pressure | Force Produced |
|---|---|---|
| * 2.0" | 60 psi | 345 lb |
| * 2.5" | 60 psi | 335 lb |

A-9

Drive cylinder behind Bladder as FESTO Typo DNN-50-50-PPV-A-S2
Double-Acting Cylinder
50mm Bore
50mm Stroke
Max 180 PSI
Series E041
Adjustable Cushioning
Acid-Resistant 50mm BORE CYLINDER = 1.9685039" DIA Shaft Diameter = .786"

Cylinder Bore Cross-Sectional Area = pi * .98425"$^2$ = 3.0434234 sq. in.

Cylinder Shaft Cross-Sectional Area = pi * .353"$^2$ = .4852 sq.in.

Working area of cylinder = Bore Area - Shaft Area

= (3.0434 - .4852) Sq. in.

= 2.5582 sq.in.

| Pressure | Force |
| --- | --- |
| 125 PSI | 320 LB |
| 120 PSI | 307 LB |
| 115 PSI | 294 LB |
| 110 PSI | 281 LB |
| 100 PSI | 256 LB |
| 95 PSI | 243 LB |
| 90 PSI | 230 LB |
| 85 PSI | 217 LB |
| 80 PSI | 215 LB |
| 75 PSI | 192 LB |
| 70 PSI | 179 LB |
| 65 PSI | 166 LB |
| 60 PSI | 153 LB |
| 55 PSI | 141 LB |
| 80 PSI | 120 LB |
| 45 PSI | 115 LB |
| 40 PSI | 102 LB |
| 35 PSI | 90 LB |
| 25 PSI | 77 LB |
| 20 PSI | 51 LB |
| 15 PSI | 38 LB |
| 10 PSI | 26 LB |

NEW CYLINDER
(changed Drive Cylinder on 2/23/95)

Drive Cylinder behind Bladder is FESTO    Type DNN-63-60-PPV-A
Double-Acting Cylinder
63 mm Bore

```
                                            60 mm Stroke
                                            MAX 150 PSI
                                            Series 0690400
                                            Adjustable Cushioning
                                            Acid-Resistant 60 mm STROKE = 2.362"

63 mm BORE CYLINDER - 2.4803149" DIA

Cylinder Bore Cross-Sectional Area = pi * 1.2402"^2
                                   = pi * 1.538096
                                   = 4.832071 sq. in.

Pressure    Force

125 PSI     604 LB
            120 PSI     578 LB
            115 PSI     556 LB
            110 PSI     532 LB
            100 PSI     256 LB
             95 PSI     243 LB
             90 PSI     230 LB
             85 PSI     217 LB
             80 PSI     215 LB
             70 PSI     192 LB
             65 PSI     166 LB
             60 PSI     153 LB
             55 PSI     141 LB
             50 PSI     128 LB
             45 PSI     115 LB
             40 PSI     102 LB
             35 PSI      90 LB
             30 PSI      77 LB
             25 PSI      64 LB
             20 PSI      51 LB
             15 PSI      38 LB
             10 PSI      26 LB
```

A-11

SUBJECT: BRANSON MINIWELDER LIFT TABLE PRESSURES APPLIED TO PART.

Information obtained from Kevin Buckley at Branson Plastic Joining in Henrietta, New York on 2-8-95

Miniwelder has a 4" BORE CYLINDER

The following was determined through the use of a strain gage load cell.

25 PSIG = 130 LBS.. ON PART
   50 PSIG = 430 LBS. ON PART
   80 PSIG = 800 LBS. ON PART

To make a good weld you want an applied force of 250 to 300 lbs per square inch of welding area.

4" Bore Cylinder Cross-Sectional Area = 12.566 in$^2$

| Pressure | Force |
|---|---|
| 100 PSI | 1257 LB |
| 95 PSI | 1194 LB |
| 90 PSI | 1131 LB |
| 85 PSI | 1068 LB |
| 80 PSI | 1005 LB |
| 75 PSI | 1005 LB |
| 70 PSI | 879 LB |
| 65 PSI | 817 LB |
| 60 PSI | 754 TB |
| 55 PSI | 691 LP |
| 50 PSI | 628 LP |
| 45 PSI | 565 LB |
| 40 PSI | 503 LB |
| 35 PSI | 440 LB. |
| 30 PSI | 377 LB |
| 25 PSI | 314 LB |
| 20 PSI | 251 LB |
| 15 PSI | 188 LB |
| 10 PSI | 126 lb. |

Note: Force on part = Force of cylinder - Weight of lift table

And, Weight of lift table = 150 lbs

Checking the Load Cell measurements for accuracy:

Therefore,

Force on part = Force of cylinder - 150

@ 25 PSI   314lb - 150lb = 164lb

VIBRATION WELDER - FINAL DESIGN
(AIR BLADDER/PNEUMATIC)

Subject: FINAL DESIGN TESTING WITH KNURLED HORN AND ANVIL PRISM FEEDBACK VOLTAGE MEASUREMENTS

Port Tube Material is the Ultra Escorene EVA
  BSG-913
  RL-2-10-95A 5-D

PRISM operating voltage: 451vac 3 phase 50Hz incoming power.
Gap: .004"
Trigger Distance: 2.320"
Bladder Pressure: 70 PSIG
Cylinder Pressure: 100 PSIG
Welded on 5-21-95
Wet
Weighted 1kg (2.2lb)
No freeze
Burst Tested on 5-24-95
Weld Time: 1.6 sec
Cool Time: 1.0 sec
Horn/Anvil Alignment: Radius to Radius mirror image on lower edges.

Setup 1 Uses the Final Long Horn - Wide width Radiused and Knurled Final Design Anvil - Radiused and Knurled.

Setup 2 Uses the Welded version of the Long, Wide Area Horn that has been stepped down at the horn tip to make it equivalent to a Narrow, Radiused, Knurled horn.

Setup 3 Uses the same configuration as in Setup 1 for a repeat condition after physical breakdown and regapping.

A-13

Setup 1 Long, WIDE, radiused, knurled horn

Voltage feedback on Pickup Coil consists of a sinewave signal where every other cycle alternates at a different peak to peak level.
Major peak to peak swing = 25 vp-p
Minor peak to peak swing = 21 vp-p
Period = 3.4 msec
Frequency = 294.1Hz

| Port Tube No | Initial Displayed Pressure (PSI) | Rupture Pressure (PSI) | No Burst Pressure (PSI) | Burst Pressure (PSI) | Actual Pressure (PSI) | Reason |
|---|---|---|---|---|---|---|
| 1 | -7 | 269 | | 269 | 276 | SW |
| 2 | -7 | 302 | | 302 | 309 | B+S |
| 3 | -7 | 320 | | 320 | 327 | SW |
| 4 | -7 | 306 | | 306 | 313 | B+S |
| 5 | -7 | 305 | | 305 | 312 | SW |
| 6 | -7 | 280 | | 280 | 287 | B+S |
| 7 | -7 | 305 | | 305 | 312 | SW |
| 8 | -7 | 283 | | 283 | 290 | SW |
| 9 | -7 | 290 | | 290 | 297 | B+S |
| 10 | -7 | 283 | | 283 | 290 | B+S |

Setup 2 Long. NARROW. Radiused. Knurled Horn

Voltage feedback on Pickup Coil consists of a sinewave signal where every other alternates at a different peak to peak level.
Major peak to peak swing = 26 vp-p
Minor peak to peak swing - 21 vp-p
Period = 3.4 msec
Frequency = 294.1Hz

| Port Tube No | Initial Displayed Pressure (PSI) | Rupture Pressure (PSI) | No Burst Pressure (PSI) | Burst Pressure (PSI) | Actual Pressure (PSI) | Reason |
|---|---|---|---|---|---|---|
| 1 | -7 | 319 | | 319 | | SW |
| 2 | -10 | 301 | | 301 | | SW |
| 3 | -10 | 319 | | 319 | | SW |

A-14

| | | | | | | |
|---|---|---|---|---|---|---|
| 4 | -10 | 294 | | 294 | | B+S |
| 5 | -10 | 319 | | 319 | | SW |
| 6 | -10 | 286 | | 286 | | SW |
| 7 | -10 | 305 | | 305 | | B+S |
| 8 | -10 | 286 | | 286 | | B+S |
| 9 | -10 | 272 | | 272 | | B+S |
| 10 | -10 | 305 | | 305 | | SW |

Setup 3 Long, WIDE, radiused, knurled horn

Voltage feedback on Pickup Coil consists of a sinewave signal where every other cycle alternates at a different peak to peak level.
Major peak to peak swing = 26 vp-p
Minor peak to peak swing = 21 vp-p
Period = 3.4 msecs
Frequency = 294.1Hz

| Port Tube No | Initial Displayed Pressure (PSI) | Rupture Pressure (PSI) | No Burst Pressure (PSI) | Burst Pressure (PSI) | Actual Pressure (PSI) | Reason |
|---|---|---|---|---|---|---|
| 1 | -10 | 282 | | 282 | 292 | B+S |
| 2 | -10 | 290 | | 290 | 300 | B+S |
| 3 | -10 | 273 | | 273 | 283 | B+S |
| 4 | -10 | 272 | | 272 | 282 | B+S |
| 5 | -10 | 265 | | 365 | 275 | B+S |
| 6 | -10 | 290 | | 290 | 300 | B+S |
| 7 | -10 | 305 | | 305 | 315 | B+S |
| 8 | -10 | 286 | | 286 | 296 | B+S |
| 9 | -10 | 272 | | 272 | 282 | B+S |
| 10 | -10 | 235 | | 235 | 245 | B+S |

A-16

VIBRATION WELDER - FINAL DESIGN
(AIR BLADDER/PNEUMATIC)

SUBJECT: Port Tube Bursting Test with Varying Bladder Pressures on the Final Design.

Port tube material is the Ultra Escorene EVA
                BSG-913
                RL-2-10-95A 5-D PRISM operating voltage 451vac 3 phase 50Hz incoming power.

Gap .004"
Trigger Distance 2.320"
Bladder Pressure: Will be varied from 20 to 60 PSI in 10 psi increments.
Cylinder Pressure: 100 PSIG
Welded on 7-25-95.
Wet
Weighed
No freeze
Burst tested on 7-31-95.
Weld Time 1.6 seconds
Cool Time 1.0 seconds
Horn/anvil alignment: radius to radius mirror image on lower edges
Horn Description: Long, wide, internally knurled face with a 1/16" radius along the lower edge.
Anvil Description: Wide, final design with internal, knurled diamond pattern and 1/16" radius along lower edge of face.

Bladder Pressure 30 PSIG

| Port Tube No | Initial Pressure (PSI) | Rupture Pressure (PSI) | No Burst Pressure (PSI) | Burst Pressure (PSI) | Actual Pressure (PSI) | |
|---|---|---|---|---|---|---|
| 1 | -10 | 240 | | 240 | 250 | SW |
| 2 | -10 | 258 | | 258 | 268 | SW |
| 3 | -10 | 247 | | 247 | 257 | SW |
| 4 | -10 | 254 | | 254 | 264 | SW |
| 5 | -10 | 257 | | 257 | 267 | BS |
| 6 | -10 | 269 | | 269 | 279 | SW |
| 7 | -10 | 272 | | 272 | 282 | SW |
| 8 | -10 | 269 | | 269 | 279 | SW |
| 9 | -10 | 250 | | 250 | 260 | SW |
| 10 | -10 | 280 | | 280 | 290 | SW |

A-17

Bladder Pressure 30 PSIG

| Port Tube No | Initial Pressure (PSI) | Rupture Pressure (PSI) | No Burst Pressure (PSI) | Burst Pressure (PSI) | Actual Pressure (PSI) | |
|---|---|---|---|---|---|---|
| 1 | -14 | 239 | — | 239 | 253 | SW |
| 2 | -14 | 261 | — | 261 | 275 | SW |
| 3 | -14 | 239 | — | 239 | 253 | SW |
| 4 | -14 | 243 | — | 243 | 257 | SW |
| 5 | -14 | 269 | — | 269 | 283 | SW |
| 6 | -14 | 243 | — | 243 | 257 | BS |
| 7 | -14 | 239 | — | 239 | 253 | SW |
| 8 | -14 | 251 | — | 251 | 265 | SW |
| 9 | -14 | 232 | — | 232 | 246 | BS |
| 10 | -14 | 257 | — | 257 | 271 | BS |

Bladder Pressure 40 PSIG

| Port Tube No | Initial Pressure (PSI) | Rupture Pressure (PSI) | No Burst Pressure (PSI) | Burst Pressure (PSI) | Actual Pressure (PSI) | |
|---|---|---|---|---|---|---|
| 1 | -14 | 261 | — | 261 | 275 | SW |
| 2 | -14 | 261 | — | 261 | 275 | SW |
| 3 | -14 | 272 | — | 272 | 286 | SW |
| 4 | -14 | 247 | — | 247 | 261 | SW |
| 5 | -14 | 239 | — | 239 | 253 | SW |
| 6 | -14 | 261 | — | 261 | 275 | SW |
| 7 | -14 | 269 | — | 269 | 283 | SW |
| 8 | -14 | 232 | — | 232 | 246 | BS |
| 9 | -17 | 247 | — | 247 | 264 | SW |
| 10 | -17 | 254 | — | 254 | 271 | SW |

A-18

Bladder Pressure 50 PSIG

| Port Tube No | Initial Pressure (PSI) | Rupture Pressure (PSI) | No Burst Pressure (PSI) | Burst Pressure (PSI) | Actual Pressure (PSI) | |
|---|---|---|---|---|---|---|
| 1 | -17 | 261 | | 261 | 278 | SW |
| 2 | -17 | 257 | | 257 | 274 | SW |
| 3 | -17 | 239 | | 239 | 256 | BS |
| 4 | -17 | 251 | | 251 | 268 | SW |
| 5 | -17 | 239 | | 239 | 256 | BS |
| 6 | -17 | 254 | | 254 | 271 | SW |
| 7 | -17 | 280 | | 280 | 297 | SW |
| 8 | -17 | 254 | | 254 | 271 | BS |
| 9 | -17 | 246 | | 246 | 263 | SW |
| 10 | -17 | 282 | | 282 | 299 | BS |

Bladder Pressure 60 PSIG

| Port Tube No | Initial Pressure (PSI) | Rupture Pressure (PSI) | No Burst Pressure (PSI) | Burst Pressure (PSI) | Actual Pressure (PSI) | |
|---|---|---|---|---|---|---|
| 1 | -17 | 265 | | 265 | 282 | BS |
| 2 | -17 | 286 | | 286 | 303 | SW |
| 3 | -17 | 239 | | 239 | 256 | BS |
| 4 | -17 | 257 | | 257 | 274 | BS |
| 5 | -17 | 250 | | 250 | 267 | BS |
| 6 | -17 | 282 | | 282 | 299 | BS |
| 7 | -17 | 254 | | 254 | 271 | BS |
| 8 | -17 | 250 | | 250 | 267 | SW |
| 9 | -17 | 243 | | 243 | 260 | BS |
| 10 | -17 | 239 | | 239 | 256 | BS |

VIBRATION WELDER PROTOTYPE
(AIR BLADDER/PNEUMATIC)

Subject: STATISTICAL RESULTS OF SCREENING STUDY NO 2

PROJECT NAME KIVALT.ECP

Created: Tue Apr 18 16:01 55 1995

`xxxxxxxxxxxxx` Coefficients for response 'Mean-logit'

Centered continuous variables

| COEFFICIENTS | SD | P | CONDITION | TERM |
|---|---|---|---|---|
| -1.52619 | | | | 0 CONSTANT |
| 17.3166 | 0.384504 | 0.0000 | 0.706 | 1 Weld-Time-Tot |
| 1.80716 | 0.954332 | 0.791 | 0.260 | 2 Weld-Time |
| 0.0250475 | 0.0086903 | 0.0121 | 0.248 | 3 Trig-Press |
| -0.0145366 | 0.00807536 | 0.0934 | 0.246 | 4 Trig-Press2 |
| -0.444243 | 0.111825 | 0.0014 | 0.973 | 5 Cool-Time |
| 0.000549966 | 0.0122511 | 0.9648- | 0.791 | 7 Weld-Time-Tot*Trig-Press |
| -0.0118983 | 0.0115285 | 0.3195- | 0.819 | 8 Weld-Time-Tot*Trig-Press2 |
| -2.15134 | 0.570482 | 0.0021 | 0.963 | 9 Weld-Time-Tot-Cool-Time |
| 0.0521895 | 0.0323042 | 0.1285 | 0.264 | 10 Weld-Time*Trig-Press1 |
| -0.0070417 | 0.01048 | 0.5126- | 0.780 | 11 Weld-Time*Trig-Press2 |
| -0.000391146 | 0.000275724 | 0.1779 | 0.238 | 13 Trig-Press*Trig-Press2 |

N trials   = 26
N terms    = 12

Residual SD = 0.276687
Residual DF = 14
Residual SD used for tests

Replicate SD = 0.271336
Replicate DF = 5

R squared     = 0.997, P=0.0000 ***
Adj R Squared = 0.994
Maximum Cook-Weisberg LD influence (scaled 0-1) = 0.915
- This term may be eliminated `xxxxxxxxxxxx` Coefficients for response 'SD-BURST'

Log e transformation used
Centered continuous variables

| COEFFICIENTS | SD | P | CONDITION | TERM |
|---|---|---|---|---|
| 1.68562 | | | | 0 CONSTANT |
| 8.76468 | 0.254351 | 0.0000 | 0.706 | 1 Weld-Time-Tot |
| -1.38569 | 0.631294 | 0.0455 | 0.260 | 2 Weld-Time |
| -0.00554859 | 0.00574866 | 0.3508 | 0.248 | 3 Trig-Press |
| -0.00485027 | 0.00534188 | 0.3793 | 0.246 | 4 Trig-Press2 |
| 0.0866238 | 0.0739728 | 0.2611- | 0.973 | 5 Cool-Time |
| -0.0209489 | 0.00810414 | 0.0216 | 0.791 | 7 Weld-Time-Tot*Trig-Press |
| 0.0141208 | 0.00762615 | 0.0853 | 0.819 | 8 Weld-Time-Tot*Trig-Press2 |
| 0.303637 | 0.377376 | 0.4345- | 0.963 | 9 Weld-Time-Tot*Cool-Time |
| -0.0440941 | 0.0213694 | 0.0581 | 0.264 | 10 Weld-Time*Trig-Press2 |
| 0.0144737 | 0.00693256 | 0.0556 | 0.780 | 11 Weld-Time*Trig-Press2 |
| -0.0002510540 | 0.00182392 | 0.1903 | 0.238 | 13 Trig-Press*Trig-Press2 |

A-20

```
N trials    = 26
N terms     = 12

Residual SD = 0.183030
Residual DF = 14
Residual SD used for tests

Replicate SD = 0.150857
Replicate DF = 5

R Squared     = 0.995, P=0.0000 ***
Adj R Squared = 0.990
Maximum Cook-Weisberg LD influence (scaled 0-1) = 1.000
- This term may be eliminated
```

Parameters:  Weld-Time = 0.500000
             Trig-Press = 10.000
             Cool-Time = 1.00

$$\text{Mean Burst} = \frac{1 + 315 \, e^{\text{mean - logit}}}{1 + e^{\text{mean - logit}}}$$

Weld-Time=1.2          Cool-Time=1.000

```
     Value  Low Limit   High Limit
     1.89     1.13        2.65

Mean
Burst 273.789  238.333    315.0707
```

Important variables to maximize Mean Burst

Weld-Time-Tot  = 1.2 seconds
             Cool-Time      = 1 second
             Trig-Press     = 10 PSIG Parameters: Weld-Time  = 0.500000
            Trig-Press = 10.000
            Cool-Time  = 1.00

Weld-Time-=1.2         Trig-Pre=10.00

```
     Value  Low Limit   High Limit
     28.01    16.53       47.01
```

Important Variables to minimize Standard Dev. Burst

Weld-Time-Tot  = 1.2 seconds
             Trig-Press     = 10 PSIG
             Weld-Time      = 0.5 seconds Best setting found for Trig-Press2 = 10 PSIG But not important.

A-22

VIBRATION WELDER PROTOTYPE

Subject: 2ND SCREENING STUDY GROUPED RESULTS

WT=WELDTIME
CT=COOLTIME
P1 = FIRST BLADDER PRESSURE
P2 = SECOND BLADDER PRESSURE
PR = PROPORTION RATIO OF THE TIME SEGMENT AT THE FIRST BLADDER PRESSURE TO
     THE OVERALL WELD TIME
 S = SMALL HORN WIDTH
 L = LARGE HORN WIDTH
 N = NO KNURL PATTERN ON HORN OR ANVIL
 H = KNURL PATTERN ON HORN, NONE ON ANVIL
 B = KNURL PATTERN ON BOTH HORN AND ANVIL

| 5 PORT | GROUPS | WT | CT | PR | P1 | P2 | Mean Burst Pressure | VARIANCE Lo | Hi | Horn Width | Horn Knurl |
|---|---|---|---|---|---|---|---|---|---|---|---|
| RUN 1 | TRIAL 4 | 1.4, | 1, | .5, | 40, | 70 | 278.2 | -4.2 | +24.8 | S | N |
| RUN 2 | TRIAL 1 | 1, | 1, | .5, | 70, | 70 | 38.8 | -23.8 | +44.2 | S | N |
| RUN 3 | TRIAL 22 | 1, | 1, | .5, | 40, | 40 | 24.0 | -8.0 | +17.0 | S | N |
| RUN 4 | TRIAL 23 | 1.4, | 1, | .5, | 40, | 40 | 267.2 | -51.2 | +31.8 | S | N |
| RUN 5 | TRIAL 4 | 1.4, | 1, | .5, | 40, | 70 | 278.4 | -4.25 | +16.75 | S | N |
| RUN 6 | TRIAL 13 | 1.4, | 1, | .5, | 70, | 70 | 278.25 | -27.25 | +16.75 | S | N |
| RUN 7 | TRIAL 36 | 1, | 1, | .5, | 40, | 70 | 27.2 | -4.2 | +15.8 | S | N |
| RUN 8 | TRIAL 27 | 1, | 1, | .5, | 55, | 55 | 21.8 | -10.8 | +4.2 | S | N |
| RUN 9 | TRIAL 1 | 1, | 1, | .5, | 70, | 70 | 20.8 | -1.8 | +5.2 | S | N |
| RUN 10 | TRIAL 26 | 1.4, | 1, | .5, | 55, | 55 | 298.6 | -20.6 | +33.4 | L | N |
| RUN 11 | TRIAL 2 | 1, | 1, | .5, | 40, | 70 | 78.0 | -64.0 | +61.0 | L | N |
| RUN 12 | TRIAL 20 | 1.4, | 1, | .5, | 40, | 70 | 321.4 | -29.4 | +27.6 | L | N |
| RUN 13 | TRIAL 3 | 1.4, | 1, | .5, | 40, | 40 | 48.4 | -37.4 | +34.6 | L | N |
| RUN 14 | TRIAL 14 | 1.4, | 1, | .5, | 40, | 40 | 282.4 | -15.4 | +16.6 | L | N |
| RUN 15 | TRIAL 19 | 1, | 1, | .5, | 70, | 70 | 23.8 | -8.8 | +24.2 | L | N |
| RUN 16 | TRIAL 2 | 1, | 1, | .5, | 40, | 70 | 40.0 | -25.0 | +47.0 | L | N |
| RUN 17 | TRIAL 40 | 1.4, | 1, | .5, | 70, | 70 | 297.6 | -23.6 | +23.4 | L | N |
| RUN 18 | TRIAL 3 | 1, | 1, | .5, | 40, | 40 | 38.4 | -27.4 | +73.6 | L | N |
| RUN 19 | TRIAL 9 | 1.4, | 1, | .5, | 40, | 70 | 275.2 | -12.2 | +16.8 | L | H |
| RUN 20 | TRIAL 8 | 1, | 1, | .5, | 40, | 70 | 15.4 | -8.4 | +13.6 | L | H |
| RUN 21 | TRIAL 21 | 1.4, | 1, | .5, | 70, | 70 | 271.0 | -26.0 | +9.0 | L | H |
| RUN 22 | TRIAL 39 | 1.4, | 1, | .5, | 40, | 40 | 268.0 | -30.0 | +6.0 | L | H |
| RUN 23 | TRIAL 17 | 1, | 1, | .5, | 70, | 70 | 18.6 | -5.6 | +10.4 | L | H |
| RUN 24 | TRIAL 43 | 1.4, | 1, | .5, | 55, | 55 | 277.8 | -14.8 | +10.2 | L | H |
| RUN 25 | TRIAL 15 | 1, | 1, | .5, | 40, | 40 | 17.6 | -2.6 | +1.4 | L | H |
| RUN 26 | TRIAL 36 | 1, | 1, | .5, | 40, | 40 | 28.6 | -17.4 | +21.6 | S | H |
| RUN 27 | TRIAL 25 | 1, | 1, | .5, | 55, | 55 | 44.6 | -22.6 | +60.6 | S | H |
| RUN 28 | TRIAL 29 | 1, | 1, | .5, | 40, | 70 | 30.2 | -4.2 | +6.8 | S | H |
| RUN 29 | TRIAL 51. | 1, | 1, | .5, | 70, | 70 | 237.0 | -200.0 | +65.0 | S | H |
| RUN 30 | TRIAL 37 | 1, | 1, | .5, | 70, | 70 | 29.8 | -11.8 | +10.2 | S | H |
| RUN 31 | TRIAL 10 | 1.4, | 1, | .5, | 40, | 40 | 298.2 | -17.2 | +7.8 | S | H |
| RUN 32 | TRIAL 42 | 1.4, | 1, | .5, | 55, | 55 | 295.4 | -17.6 | +14.6 | S | H |
| RUN 33 | TRIAL 35 | 1.4, | 1, | .5, | 40, | 70 | 297.4 | -27.4 | +23.6 | S | H |
| RUN 34 | TRIAL 5 | 1.4, | 1, | .5, | 70, | 70 | 306.2 | -32.2 | +21.8 | S | H |
| RUN 35 | TRIAL 7 | 1.4, | 1, | .5, | 40, | 70 | 275.6 | -15.6 | +16.4 | S | B |
| RUN 36 | TRIAL 1B | 1, | 1, | .5, | 40, | 70 | 26.0 | -8.0 | +11.0 | S | B |
| RUN 37 | TRIAL 11 | 1, | 1, | .5, | 40, | 40 | 19.8 | -4.8 | +6.2 | S | B |
| RUN 38 | TRIAL 33 | 1.4, | 1, | .5, | 40, | 40 | 258.8 | -20.8 | +11.2 | S | B |
| RUN 39 | TRIAL 16 | 1, | 1, | .5, | 70, | 70 | 30.0 | -15.0 | +35.0 | S | B |
| RUN 40 | TRIAL 28 | 1, | 1, | .5, | 55, | 55 | 19.0 | -8.0 | +7.0 | S | B |
| RUN 41 | TRIAL 34 | 1.4, | 1, | .5, | 70, | 70 | 268.8 | -19.8 | +9.2 | S | B |
| RUN 42 | TRIAL 41 | 1.4, | 1, | .5, | 70, | 70 | 254.4 | -17.4 | +40.6 | L | B |
| RUN 43 | TRIAL 6 | 1.4, | 1, | .5, | 40, | 40 | 251.2 | -13.2 | +28.8 | L | B |
| RUN 44 | TRIAL 30 | 1.4, | 1, | .5, | 40, | 70 | 271.2 | -12.2 | +33.0 | L | B |
| RUN 45 | TRIAL 32 | 1.4, | 1, | .5, | 55, | 55 | 260.8 | -8.8 | +13.2 | L | B |
| RUN 46 | TRIAL 24 | 1, | 1, | .5, | 70, | 70 | 24.6 | -17.6 | +55.4 | L | B |
| RUN 47 | TRIAL 12 | 1, | 1, | .5, | 40, | 70 | 70.8 | -60.8 | +31.2 | L | B |
| RUN 48 | TRIAL 31 | 1, | 1, | .5, | 40, | 40 | 79.4 | -72.4 | +28.6 | L | B |

A-24

One Second Weld Group Organized by Pressure

| 5 PORT | GROUPS | WT | CT | PR | P1 | P2 | Mean Burst Pressure | VARIANCE Lo | Hi | Horn Width | Horn Knurl |
|---|---|---|---|---|---|---|---|---|---|---|---|
| RUN 3 | TRIAL 22 | 1, | 1, | .5, | 40, | 40 | 24.0 | - 8.0 | +17.0 | WF | |
| RUN 18 | TRIAL 3 | 1, | 1, | .5, | 40, | 40 | 38.4 | -27.4 | +73.6 | WF | |
| RUN 25 | TRIAL 15 | 1, | 1, | .5, | 40, | 40 | 17.6 | - 2.6 | + 1.4 | WF | |
| RUN 37 | TRIAL 11 | 1, | 1, | .5, | 40, | 40 | 19.8 | - 4.8 | + 6.2 | WF | |
| RUN 26 | TRIAL 36 | 1, | 1, | .5, | 40, | 40 | 28.6 | -17.4 | +21.6 | WF | |
| RUN 48 | TRIAL 31 | 1, | 1, | .5, | 40, | 40 | 79.4 | -72.4 | +28.6 | WF | |
| | | | | | | Avg Mean 18 | | | | | |
| RUN 7 | TRIAL 36 | 1, | 1, | .5, | 40, | 70 | 27.2 | - 4.2 | +15.8 | WF | |
| RUN 11 | TRIAL 2 | 1, | 1, | .5, | 40, | 70 | 78.0 | -64.0 | +61.0 | WF | |
| RUN 16 | TRIAL 2 | 1, | 1, | .5, | 40, | 70 | 40.0 | -25.0 | +47.0 | WF | |
| RUN 20 | TRIAL 8 | 1, | 1, | .5, | 40, | 70 | 15.4 | - 8.4 | +13.6 | WF | |
| RUN 28 | TRIAL 29 | 1, | 1, | .5, | 40, | 70 | 30.2 | - 4.2 | + 6.8 | WF | |
| RUN 36 | TRIAL 18 | 1, | 1, | .5, | 40, | 70 | 26.0 | - 8.0 | +11.0 | WF | |
| RUN 47 | TRIAL 12 | 1, | 1, | .5, | 40, | 70 | 70.8 | -60.8 | +31.2 | WF | |
| | | | | | | Avg Mean 41.1 | | | | | |
| RUN 8 | TRIAL 27 | 1, | 1, | .5, | 55, | 55 | 21.8 | -10.8 | + 4.2 | WF | |
| RUN 27 | TRIAL 25 | 1, | 1, | .5, | 55, | 55 | 44.6 | -22.6 | +60.6 | WF SW PD | |
| RUN 40 | TRIAL 28 | 1, | 1, | .5, | 55, | 55 | 19.0 | - 8.0 | + 7.0 | WF | |
| | | | | | | Avg Mean 28.5 | | | | | |
| RUN 9 | TRIAL 1 | 1, | 1, | .5, | 70, | 70 | 20.8 | - 1.8 | + 5.2 | WF | |
| RUN 2 | TRIAL 1 | 1, | 1, | .5, | 70, | 70 | 38.8 | -23.8 | +44.2 | WF | |
| RUN 15 | TRIAL 19 | 1, | 1, | .5, | 70, | 70 | 23.8 | - 8.8 | +24.2 | WF | |
| RUN 23 | TRIAL 17 | 1, | 1, | .5, | 70, | 70 | 18.6 | - 3.6 | +10.4 | WF | |
| RUN 29 | TRIAL 5 | 1, | 1, | .5, | 70, | 70 | 237.0 | -200.0 | +65.0 | SW.PD,WF | |
| RUN 30 | TRIAL 37 | 1, | 1, | .5, | 70, | 70 | 29.9 | -11.8 | +10.2 | WF | |
| RUN 39 | TRIAL 16 | 1, | 1, | .5, | 70, | 70 | 30.0 | -15.0 | +35.0 | WF | |
| RUN 46 | TRIAL 24 | 1, | 1, | .5, | 70, | 70 | 24.6 | -17.6 | +55.4 | WF | |
| | | | | | | Avg Mean 32.6 | | | | | |

1.4 Second Weld Group Organized by Pressure

| 5 PORT | GROUPS | WT | CT | PR | P1 | P2 | Mean Burst Pressure | VARIANCE Lo | Hi | Horn Width | Horn Knurl |
|---|---|---|---|---|---|---|---|---|---|---|---|
| RUN 4  | TRIAL 23 | 1.4, | 1, | .5, | 40, | 40 | 267.2 | -51.2 | +31.9 | SW WF | |
| RUN 13 | TRIAL 3  | 1.4, | 1, | .5, | 40, | 40 | 48.4  | -37.4 | +34.6 | WF *? | |
| RUN 14 | TRIAL 14 | 1.4, | 1, | .5, | 40, | 40 | 282.4 | -15.4 | +16.6 | SW PD | |
| RUN 22 | TRIAL 39 | 1.4, | 1, | .5, | 40, | 40 | 268.0 | -30   | +16.0 | WF SW PD | |
| RUN 31 | TRIAL 10 | 1.4, | 1, | .5, | 40, | 40 | 298.2 | -17.2 | + 7.8 | SW PD | |
| RUN 38 | TRIAL 33 | 1.4, | 1, | .5, | 40, | 40 | 258.8 | -20.8 | +11.2 | WF SW PD | |
| RUN 43 | TRIAL 6  | 1.4, | 1, | .5, | 40, | 40 | 251.2 | -13.2 | +28.8 | WF | |

Avg Mean 239.2

| RUN 12 | TRIAL 20 | 1.4. | 1, | .5, | 40, | 70 | 321.4 | -29.4 | +27.6 | SW PD | |
| RUN 1  | TRIAL 4  | 1.4  | 1, | .5, | 40, | 70 | 278.2 | - 4.2 | +24.8 | SW PD | |
| RUN 5  | TRIAL 4  | 1.4  | 1, | .5, | 40, | 70 | 278.4 | - 4.25| +16.75| WF SW.PD | |
| RUN 19 | TRIAL 9  | 1.4. | 1, | .5, | 40, | 70 | 275.2 | -12.2 | +16.8 | WF SW PD | |
| RUN 33 | TRIAL 35 | 1.4, | 1, | .5, | 40, | 70 | 297.4 | -27.4 | +23.6 | SW PD | |
| RUN 35 | TRIAL 7  | 1.4, | 1, | .5, | 40, | 70 | 275.6 | -15.6 | +16.4 | WF SW | |
| RUN 44 | TRIAL 30 | 1.4, | 1, | .5, | 40, | 70 | 271.2 | -12.2 | +33   | WF SW | |

Avg Mean 285.3

| RUN 10 | TRIAL 26 | 1.4, | 1, | .5, | 55, | 55 | 298.6 | -20.6 | +33.4 | SW WF | |
| RUN 24 | TRIAL 43 | 1.4, | 1, | .5, | 55, | 55 | 277.8 | -14.8 | +10.2 | WF | |
| RUN 32 | TRIAL 42 | 1.4, | 1, | .5, | 55, | 55 | 295.4 | -17.6 | +14.6 | SW PD | |
| RUN 45 | TRIAL 32 | 1.4, | 1, | .5, | 55, | 55 | 260.8 | - 8.8 | +13.2 | WF SW PD | |

Avg Mean 283.2

| RUN 6  | TRIAL 13 | 1.4, | 1, | .5, | 70, | 70 | 278.25 | -27.75 | +22.25 | WF SW PD | |
| RUN 17 | TRIAL 40 | 1.4, | 1, | .5, | 70, | 70 | 297.6  | -23.6  | +23.4  | SW PD | |
| RUN 21 | TRIAL 21 | 1.4, | 1, | .5, | 70, | 70 | 271.0  | -26.0  | + 9.0  | WF SW,PD | |
| RUN 34 | TRIAL 5  | 1.4, | 1, | .5, | 70, | 70 | 306.2  | -32.2  | +21.8  | SW PD | |
| RUN 41 | TRIAL 34 | 1.4, | 1, | .5, | 70, | 70 | 268.8  | -19.8  | + 9.2  | SW PD WF | |
| RUN 42 | TRIAL 41 | 1.4, | 1, | .5, | 70, | 70 | 254.4  | -17.4  | +40.6  | WF SW PD | |

Avg Mean 279.4

1.4 Second Weld Groups Organized by Horn Pattern

| 5 PORT | GROUPS | WT | CT | PR | P1 | P2 | Mean Burst Pressure | VARIANCE Lo | Hi | Horn Width | Horn Knurl |
|---|---|---|---|---|---|---|---|---|---|---|---|
| RUN 4  | TRIAL 23 | 1.4, 1, | .5, | 40, | 40 | 267.2 | -51.2 | +31.8 | S N | SW WF |
| RUN 1  | TRIAL 4  | 1.4, 1, | .5, | 40, | 70 | 278.2 | - 4.2 | +24.8 | S N | SW PD |
| RUN 5  | TRIAL 4  | 1.4, 1, | .5, | 40, | 70 | 278.4 | - 4.25 | +16.75 | S N WF | SW PD |
| RUN 6  | TRIAL 13 | 1.4, 1, | .5, | 70, | 70 | 278.25 | -27.25 | +16.75 | S N WF | SW PD |
| | | | | | | Mean Avg 275.5 | | | | |
| RUN 31 | TRIAL 10 | 1.4, 1, | .5, | 40, | 40 | 298.2 | -17.2 | + 7.8 | S H | SW PD |
| RUN 33 | TRIAL 35 | 1.4, 1, | .5, | 40, | 70 | 297.4 | -27.4 | +23.6 | S H | SW PD |
| RUN 32 | TRIAL 42 | 1.4, 1, | .5, | 55, | 55 | 295.4 | -17.6 | +14.6 | S H | SW PD |
| RUN 34 | TRIAL 5  | 1.4, 1, | .5, | 70, | 70 | 306.2 | -3L.2 | +21.8 | S H | SW PD |
| | | | | | | Mean Avg 299.3 | | | | |
| RUN 38 | TRIAL 33 | 1.4, 1, | .5, | 40, | 40 | 258.8 | -20.8 | +11.2 | S B | WF SW PD |
| RUN 35 | TRIAL 7  | 1.4, 1, | .5, | 40, | 70 | 275.6 | -15.6 | +16.4 | S B | WF SW |
| RUN 41 | TRIAL 34 | 1.4, 1, | .5, | 70, | 70 | 268.8 | -19.8 | + 9.2 | S B | SW PD WF |
| | | | | | | Mean Avg 267.7 | | | | |
| RUN 13 | TRIAL 3  | 1.4, 1, | .5, | 40, | 40 | 48.4  | -37.4 | +34.6 | L N | WF |
| RUN 14 | TRIAL 14 | 1.4, 1, | .5, | 40, | 40 | 282.4 | -15.4 | +16.6 | L N | SW PD |
| RUN 12 | TRIAL 20 | 1.4, 1, | .5, | 40, | 70 | 321.4 | -29.4 | +27.6 | L N | SW PD |
| RUN 10 | TRIAL 26 | 1.4, 1, | .5, | 55, | 55 | 298.6 | -20.6 | +33.4 | L N | |
| RUN 17 | TRIAL 40 | 1.4, 1, | .5, | 70, | 70 | 297.6 | -23.6 | +23.4 | L N | |
| | | | | | | Mean Avg 249.68 With Outlier | | | | |
| | | | | | | Mean Avg 300.00 Without Outlier | | | | |
| RUN 22 | TRIAL 39 | 1.4, 1, | .5, | 40, | 40 | 268.0 | -30.0 | + 6.0 | L H | |
| RUN 19 | TRIAL 9  | 1.4, 1, | .5, | 40, | 70 | 275.2 | -12.2 | +1D.8 | L H | |
| RUN 24 | TRIAL 43 | 1.4, 1, | .5, | 55, | 55 | 277.8 | -14.8 | +10.2 | L H | |
| RUN 21 | TRIAL 21 | 1.4, 1, | .5, | 70, | 70 | 271.0 | -26.0 | + 9.0 | L H | |
| | | | | | | Mean Avg 273.00 | | | | |
| RUN 43 | TRIAL 6  | 1.4, 1, | .5, | 40, | 40 | 251.2 | -13.2 | +28.8 | L B | |
| RUN 44 | TRIAL 30 | 1.4, 1, | .5, | 40, | 70 | 271.2 | -12.2 | +33.0 | L B | |
| RUN 45 | TRIAL 32 | 1.4, 1, | .5, | 55, | 55 | 260.8 | - 8.8 | +13.2 | L B | |
| RUN 42 | TRIAL 41 | 1.4, 1, | .5, | 70, | 70 | 254.4 | -17.4 | +40.6 | L B | |
| | | | | | | Mean Avg 259.4 | | | | |

A-27

Results:
In the prior Screening Study No. 1, it was indicated that a .8 second weld resulted in weld fractures.
A 1.2 second weld resulted in sidewall bursts.
Cool Time was not significant and could be held constant at the minimum tested (1 second).
The bladder pressure proportion of .5 seemed to achieve slightly higher mean burst pressures and is well constant in this experiment.
These welds were done with the short sonic horn having a knurl patters in the horn and a blank relief of .050" on the lower edge. The anvil was also knurled.

Bladder pressures below 40 pounds resulted in very poor burst pressures.

In this Screening Study, No. 2, it was thought to test the area around 1.2 seconds to see if going longer on weld time would improve burst strength. The range of weld time becomes 1 to 1.4 seconds and we test these limits.

Changes from the previous experiment are:
1) Long Horn instead of short.
2) Symmetrical Chisel to the line of center.
3) Large and Small width versions of the long horn.
4) Start with Blank Faced Horns and Anvil;
   knurl progressively horn and then both horn and
   anvil; do experiments after each transition.

From the tables above, all 1 second weld times resulted in weld fractures. These port tubes were delaminated on one or both sides of the weld pattern when thawed from the freezer.
The weld fracture pressures indicated above for these tubes were, in fact, the initial driving pressure indication of the burst testing machine. These ports will weep at lower pressures.

The burst pressures for 1.4 second weld resulted in a mixture of Weld Fractures and Side Wall Bursts.

What is claimed is:

1. An apparatus for filling and sealing batches of separate, premanufactured intravenous solution bags in a sterile environment, each bag having a weldably sealable opening for introducing intravenous solution into the bag, said apparatus comprising:

a generally sealed enclosure defining an interior space sized and shaped for simultaneously containing a plurality of separate, premanufactured intravenous solution bags to prevent contamination of the bags;

a rack positioned within the interior space of the enclosure configured for suspending said plurality of separate, premanufactured bags in the enclosure in a generally stationary location until ready for filling;

an intravenous solution delivery system positioned at least partially inside the interior space of the enclosure for delivering intravenous solution through the openings of said plurality of solution bags to fill the bags while the bags are in said enclosure;

a welder positioned at least partially inside the interior space of the enclosure for hermetically sealing the openings of the bags after they have been filled with intravenous solution and while they are in the enclosure; and a transport system positioned at least partially inside the interior space of the enclosure adapted for separately transporting each bag of said plurality of intravenous bags from the rack to a filling station where the bag is filled by said intravenous solution delivery system.

2. The apparatus as set forth in claim 1 wherein said transport system is further adapted for transporting each of said plurality of intravenous bags between a sealing station where the opening is sealed and a bag removal station.

3. The apparatus as set forth in claim 2 wherein the bag has a port tube defining the opening of the bag, and wherein the transport system suspends the bag from the port tube.

4. The apparatus as set forth in claim 3 wherein the transport system comprises a turntable and a drive for rotating the turntable to transport a filled and sealed bag from said filling and sealing station to said bag removal station.

5. The apparatus as set forth in claim 4 wherein the turntable includes an arm having an aperture for suspending a bag as the bag is transported between said stations.

6. The apparatus as set forth in claim 1 wherein the enclosure has a slot communicating with the interior space of the enclosure to permit removal of said bags from the enclosure.

7. The apparatus as set forth in claim 1 further comprising a glove sealingly attached to the enclosure and extending into the interior space of the enclosure for manually manipulating the bags within the enclosure.

8. The apparatus as set forth in claim 1 wherein the interior space of the enclosure is pressurized to inhibit entry of contaminates into the interior space of the enclosure.

9. The apparatus as set forth in claim 1 wherein the intravenous solution delivery system includes a filling tube and a pump for pumping intravenous solution through the tube.

10. The apparatus as set forth in claim 9 wherein the intravenous solution delivery system further includes a valve for controlling delivery of intravenous solution to said bags.

11. The apparatus as set forth in claim 9 wherein the intravenous solution delivery system further includes an actuator for inserting the filling tube into the openings of said bags before filling and for removing the filling tube from said openings after filling.

12. The apparatus as set forth in claim 1 wherein the welder comprises an anvil and a vibrating sealing head, at least one of said anvil and sealing head being movably disposed with respect to the other of said anvil and sealing head for applying pressure to a bag, the sealing head being operable to vibrate with respect to the anvil while applying pressure to the bag for hermetically sealing the opening of the bag to prevent the escape of intravenous solution from the bag.

13. The apparatus as set forth in claim 12 wherein the welder further comprises an actuator for moving the sealing head with respect to the anvil.

14. The apparatus as set forth in claim 1 wherein said transport system includes:

a turntable for transporting each bag of said plurality of intravenous bags to the filling station and from a sealing station where the opening is sealed.

15. A method of filling and sealing a batch of separate, premanufactured intravenous solution bags in a sterile environment, each bag having a weldably sealable opening for introducing intravenous solution into the bag, said method comprising the steps of:

loading a plurality of separate, premanufactured intravenous solution bags into a staging area of a generally sealable enclosure, each of said separate, premanufactured bags being wrapped in a sealed container to prevent contamination prior to loading;

sealing said enclosure loaded with bags;

opening said sealed container inside the sealed enclosure;

removing at least one of the plurality of bags from the container;

transporting said at least one bag from the staging area to a filling station;

filling said at least one bag with intravenous solution at the filling station; and hermetically sealing the opening of said at least one bag filled with intravenous solution by welding the opening closed with a welder while said bag is in said enclosure.

16. A method as set forth in claim 15 wherein a vibration welder is used to perform the step of sealing the opening.

17. A method as set forth in claim 15 further comprising the step of sterilizing said plurality of intravenous solution bags before filling the bag with intravenous solution.

18. A method as set forth in claim 17 wherein the step of sterilizing said bags is performed by spraying a chemical sterilization agent into the enclosure when said bags are inside the enclosure.

19. A method as set forth in claim 15 further comprising the step of transporting one of said bags from a staging area where the bags are stored prior to filling to a filling and sealing station where the bag is filled and the opening is sealed.

20. A method as set forth in claim 19 further comprising the step of transporting one of said bags from said filling and sealing station to a bag removal station.

* * * * *